(12) United States Patent
Nagase

(10) Patent No.: US 6,680,770 B1
(45) Date of Patent: Jan. 20, 2004

(54) LIQUID CRYSTAL DISPLAY DEVICE AND REPAIR PROCESS FOR THE SAME WHEREIN TFT HAVING PARTICULAR ELECTRODES

(75) Inventor: Yoji Nagase, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/291,886

(22) Filed: Apr. 14, 1999

(30) Foreign Application Priority Data

Sep. 7, 1998 (JP) ............................ 10-252126

(51) Int. Cl.[7] ...................... G02F 1/1343; G02F 1/136; G02F 1/13
(52) U.S. Cl. ........................ 349/139; 349/43; 349/192
(58) Field of Search ...................... 349/139, 42, 43, 349/45, 54, 192

(56) References Cited

U.S. PATENT DOCUMENTS

| | | | |
|---|---|---|---|
| 5,132,819 A | * 7/1992 | Noriyama et al. | 359/58 |
| 5,373,379 A | * 12/1994 | Nakai | 359/59 |
| 5,434,686 A | * 7/1995 | Kanemori et al. | 359/59 |
| 5,648,826 A | * 7/1997 | Song et al. | 349/49 |
| 5,684,547 A | * 11/1997 | Park et al. | 359/59 |
| 5,691,786 A | * 11/1997 | Nakai | 349/39 |
| 5,877,827 A | * 3/1999 | Lee | 349/43 |
| 6,259,494 B1 | * 7/2001 | Kawai et al. | 349/39 |
| 6,313,889 B1 | * 11/2001 | Song et al. | 349/54 |

FOREIGN PATENT DOCUMENTS

| | | |
|---|---|---|
| JP | 5-110100 | 4/1993 |
| KR | 000146263 | 5/1998 |

* cited by examiner

*Primary Examiner*—Tarifur R. Chowdhury
*Assistant Examiner*—Mike Qi
(74) *Attorney, Agent, or Firm*—Greer, Burns, & Crain, Ltd.

(57) ABSTRACT

A liquid crystal display device comprising: a gate bus line 12a; a data bus line 20a crossing the gate bus line: a picture element electrode 36; and a transistor including a first electrode 44 connected to the data bus line, a second electrode 40 connected to the picture element electrode, and a gate electrode 13, the first electrode 44, the second electrode 40 or the gate electrode 13 being extended along the gate bus line 12a or the data bus line 20a. The first electrode 44, the second electrode 40 or the gate electrode 13 is extended along the gate bus line 12a or the data bus line 20a, whereby a line disconnected part of the gate bus line 12a or the data bus line 20a can be repaired by the first electrode 44, the second electrode 40 or the gate electrode 13.

25 Claims, 29 Drawing Sheets

LIQUID CRYSTAL DISPLAY DEVICE AND REPAIR PROCESS FOR THE SAME WHEREIN TFT HAVING PARTICULAR ELECTRODES

BACKGROUND OF THE INVENTION

The present invention relates to a liquid crystal display device and a repair process for the same, more specifically to a liquid crystal display device disconnection of the bus lines of which can be repaired and a repair process for the same.

Recently, active matrix-type liquid crystal display devices are widely used in OA machines and tools, typically personal computers, and are larger-sized and more fined for the purpose of their application to EWS (Engineering WorkStations), etc.

However, there is a tendency that the bus lines for driving the TFTs (Thin-Film Transistors) of the picture elements are made longer for larger sizes of the liquid crystal display devices, and for further fineness of the liquid crystal display devices the bus lines are made thinner. Accordingly, the bus lines have higher possibility of being disconnected in the process of fabricating the bus lines.

A conventional liquid crystal display device, and a conventional repair process for repairing disconnected bus lines of the liquid crystal device will be explained with reference to FIG. 27. FIG. 27 is a plan view of the conventional liquid crystal display device.

As shown in FIG. 27, gate bus lines 112 are formed on a glass substrate 110, extended horizontally as viewed in the drawing, and data bus lines 120 are formed, crossing the gate bus lines 112.

A plurality of TABs (Tape Automated Bondings) 116a, 116b are adhered to the left margin of the glass substrate 110 as viewed in the drawing. Gate drivers 114a, 114b are formed respectively on the gate TABs 116a, 116b. The respective gate lines 112 are connected to the outputs of the gate drivers 114a, 114b. The gate TABs 116a, 116b are adhered to a print substrate 118.

On the other hand, a plurality of data TABs 124a to 124c are adhered to the lower margin of the glass substrate 110 as viewed in the drawing. Respective data drivers 122a to 122c are formed in the data TABs 124a to 124c. The respective data bus lines 120 are connected to the outputs of the data drivers 122a to 122c. The data TABs 124a to 124c are adhered to the print substrate 126.

Repair lines 134a to 134c are formed, crossing the data bus lines 120 below a display region 130 of the liquid crystal display device. The repair lines 134a to 134c are associated respectively with the data TABs 124a to 124c and are connected to lines (not shown) of the print substrate 126 via the data TABs 124a to 124c.

On the other hand, repair lines 132a to 132c are formed, crossing the data bus lines 120 upper of the display region 130 of the liquid crystal display device. The repair lines 132a to 132c are extended to the right as viewed in the drawing corresponding respectively to the repair lines 134a to 134c. The repair lines 132a to 132c are connected to lines (not shown) of a print substrate 118 via the gate TAB 116a.

The repair line 132a is connected to the repair line 134a via the print substrate 118, the connection cable 128 and the print substrate 126. Similarly therewith, the repair line 132b is connected to the repair line 134b, and the repair line 132c is connected to the repair line 134c.

In the liquid crystal display device having such structure, when the data bus line 120 is disconnected at a line disconnected part 121, for example, the line disconnection has been repaired by the following process.

First, a laser beam is applied to a region where the data bus line 120a, which is upper of the line disconnected part 121 as viewed in the drawing, crosses the repair line 132c from the side of the glass substrate 110 to electrically connect the data bus line 120a to the repair line 132c. Thus, the data bus line 120a and the repair line 132c are connected to each other in a connection region 133a.

Similarly therewith, the data bus line 120b, which is below the line disconnected part 121 as viewed in the drawing, and the repair line 134c are connected to each other, and the data bus line 120b and the repair line 134c are connected to each other in a connection region 133b.

The data bus line 120a, which is upper of the line disconnected part 121 as viewed in the drawing, is brought into connection with the output of the data driver 122c because the repair line 132c and the repair line 134c are connected to each other in advance by the print substrate 118, the connection cable 128 and the print substrate 126, etc.

However, the above-described line disconnection repair is only for disconnection of the data bus lines 120 and cannot repair disconnection of the gate bus lines 112.

That is, in the normal gate bus line 112 without disconnection a gate signal has a time constant which increases away from the output of the gate drivers 114 as shown in FIG. 28A, and has waveforms of blunter rises and falls.

In contrast to this, in the above-described case that the disconnection of the gate bus line 112 is repaired, the gate bus line 112a and the gate driver 114 are connected to each other by the repair line 135 in a remotest region from the gate driver 114 without the intermediary of capacitance components, etc. in the display region 130. Accordingly, a signal waveform of the gate bus line 112a is adversely substantially the same as that of an output waveform of the gate driver 114.

Furthermore, as a gate signal comes nearer the disconnected line part 113 from the remotest region from the gate driver 114, the gate signal has a time constant increased and has waveforms of blunt rises and falls.

As a result, a signal waveform of the gate bus line 112a (see FIG. 28B) and a signal waveform (see FIG. 28A) of the normal gate bus line 112 adjacent to the gate bus line 112a are shifted with respect to each other. The shift between the signal waveforms of the gate bus line 112 and that of the gate bus line 112a causes the following potential shift between picture element electrodes. A mechanism for causing the potential shift between picture element electrodes adjacent to each other will be explained with reference to FIG. 29A and 29B.

As shown in FIG. 29B, when a gate signal Vg falls, a potential Vp of a picture element electrode 136 lowers by a potential difference ΔVs than a potential Vd of the data bus line 144.

A potential difference AVs is expressed by $$\Delta Vs = C_{gs}/(C_{gs}+C_s+C_{1c}) \times (Vg_{on} - Vg_{off})$$

when a potential $Vg_{on}$ of the gate bus line 112 at the time that a gate signal is ON; a potential $Vg_{off}$ of the gate bus line 112 at the time that a gate signal is OFF; a capacitance $C_{gs}$ between the gate bus line 112 and the picture element electrode 136; a capacitance between the picture element electrode 136 and a Cs bus line 115 is $C_s$; and a capacitance between the picture element electrode 136 and an opposed electrode 117 is $C_{lc}$.

Accordingly, when a potential Vg changes as indicated by the dot line in the gate bus line 112a having the disconnection repaired, and a potential Vg changes as indicated by the solid line in the normal gate bus line 112 adjacent to the gate bus line 112a, an effective value of $Vg_{on}$–$Vg_{off}$ differs between the gate bus line 112a having the disconnection repaired and the normal gate bus line 112 adjacent thereto. When an effective value of $Vg_{on}$–$Vg_{off}$ thus differs, a potential difference Vs differs, whereby the picture element electrode 136 connected to the gate bus line 112a having the disconnection repaired and the normal gate bus line 112 adjacent thereto have different potential Vp from each other. A potential Vp of the picture element electrode 136 influences luminance of display of the liquid crystal display device, with a result that a line defect is caused in display on the gate bus line 112a having the line disconnection repaired.

When a data bus line 120 has a line disconnection repaired, a waveform displacement takes place between the repaired bus line 120 and its adjacent normal data bus line 120. However, this causes no problem because a data signal Vd and a gate signal Vg are so timed that, as shown in FIG. 29B, the gate signal Vg falls after the data signal Vd has become constant, and a potential of a picture element electrode 136 is set.

The above-described conventional repair process for a liquid crystal display device requires the repair lines 132a to 132c, 134a to 134c be formed outside the display region 130, which requires a region for the repair lines 132a to 132c, 134a to 134c formed in. To this end a large space must be secured outside the display region 130, which has been a barrier to small-sizing the liquid crystal display device.

It often happens that insulation destruction of the insulation film due to static electricity between the repair lines 132a–132c and 134a–134c, and the data bus lines 120 crossing the repair lines, which is a factor for reducing fabrication yields of the liquid crystal display device.

It is necessary to form on the print substrates 118, 126, etc. lines for respectively interconnecting the repair lines 132a, 132b, 132c and the repair lines 134a, 134b, 134c, which is a factor for making the design complicated and resultantly a barrier to cost reduction of the liquid crystal display device.

In a case that because of the repair lines 132a–132c, 134a–134c, etc. a total line length is long, it is necessary to insert operational amplifiers, etc. in the lines.

SUMMARY OF THE INVENTION

An object of the present invention is to provide a liquid crystal display device a disconnection of a bus line of which can be repaired without degrading display characteristics, and a repair process therefor.

The above-described objects can be achieved by a repair process for a liquid crystal display device comprising a gate bus line, a data bus line crossing the gate bus line, a picture element electrode, and a transistor including a first electrode connected to the data bus line and a second electrode connected to the picture element electrode, the first electrode being extended along the gate bus line, in a case that the gate bus line has a line disconnection, that of the gate bus line on one side of the line disconnected part and the first electrode being connected, and that of the gate bus line on the other side of the line disconnected part being connected to the first electrode, whereby the line disconnected part of the gate bus line is repaired by the first electrode, and the first electrode being disconnected from the data bus line.

In the above-described repair process for a liquid crystal display device it is preferable that the first electrode is connected to the data bus line through a connection with a notch formed in, and the connection is disconnected at a region where the data bus line is thinned by the notch when the first electrode is disconnected from the data bus line. The notch partially thins the connection, whereby the connection can be disconnected for a short period of time. The notch apparently indicates a region to be disconnected, which improves efficiency of processing for disconnecting the connection.

BRIEF DESCRIPTION OF THE DRAWINGS

FIGS. 29A and 28B are views of a mechanism for causing potential shifts of a picture element electrode.

DETAILED DESCRIPTION OF THE INVENTION

A First Embodiment

Figure 1:
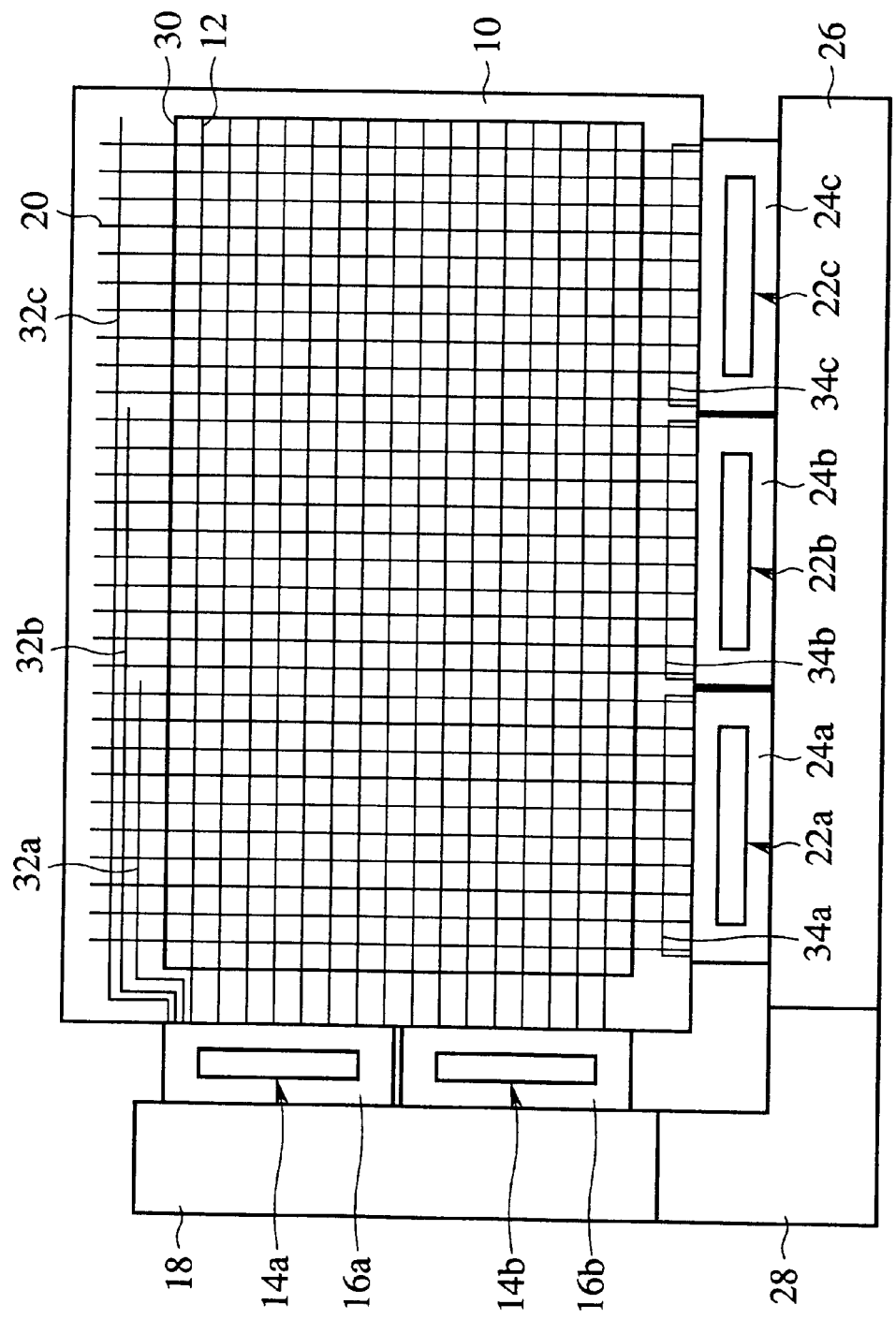
FIG. 1 is a plan view of the liquid crystal display device according to a first embodiment of the present invention, which shows a general constitution thereof.
Figure 2:
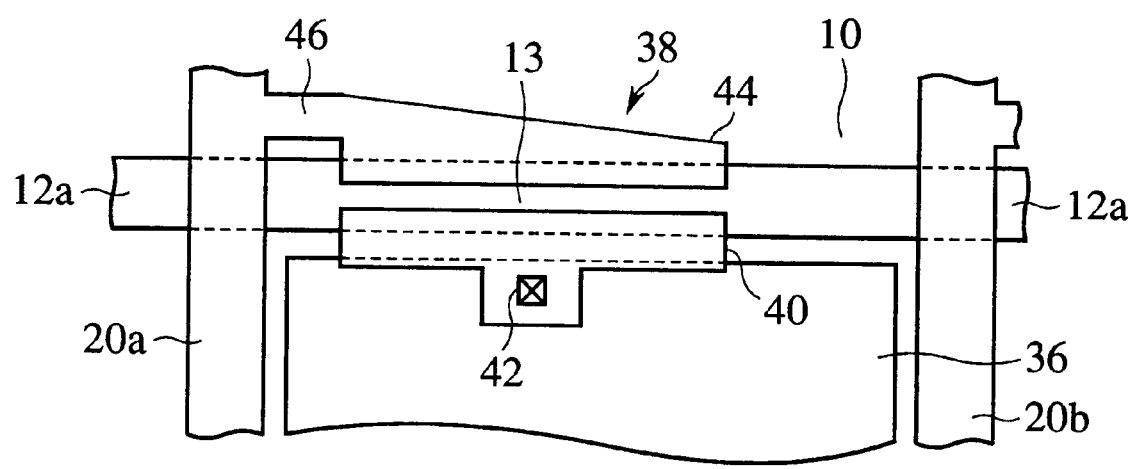
FIG. 2 is a plan view of the liquid crystal display device according to the first embodiment of the present invention.
Figure 3A:
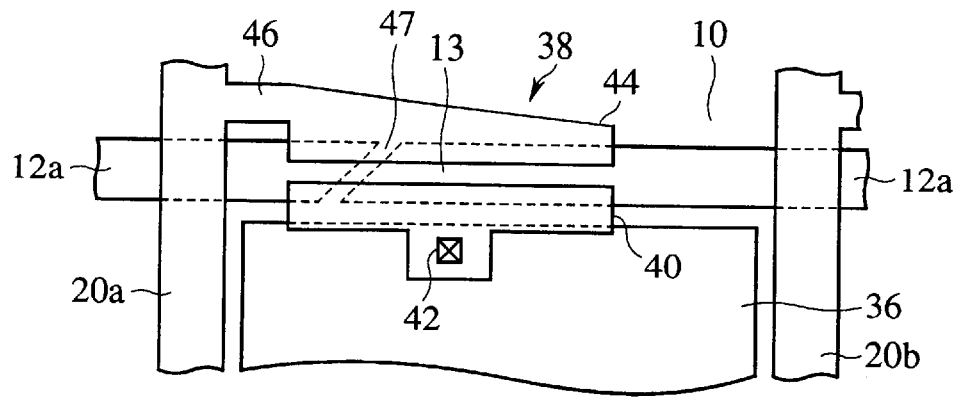
FIGS. 3A to 3C are plan views of the liquid crystal display device according to the first embodiment of the present invention, which show a repair process therefor.
Figure 3B:
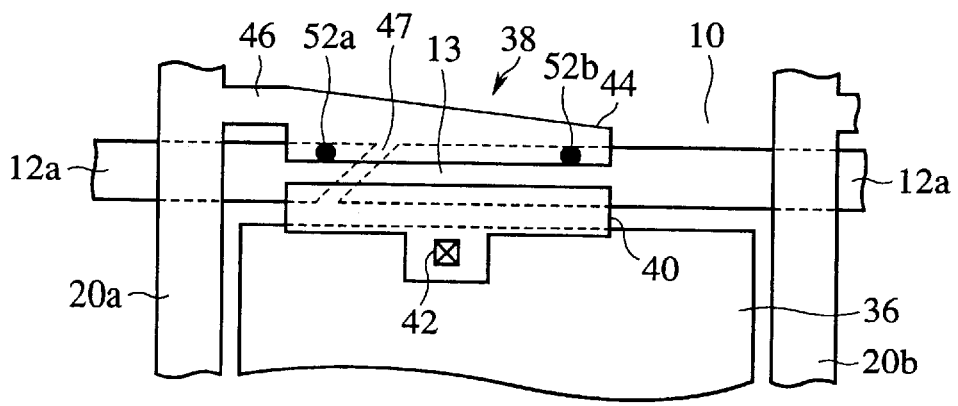
Figure 3C:
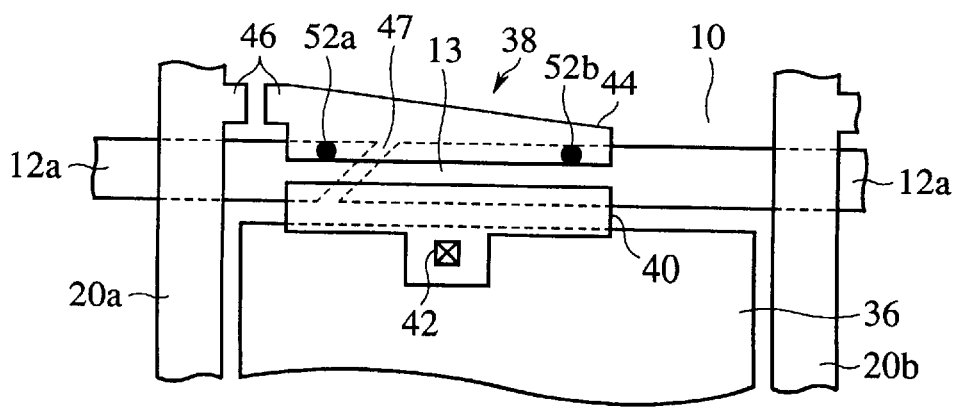
Figure 4A:
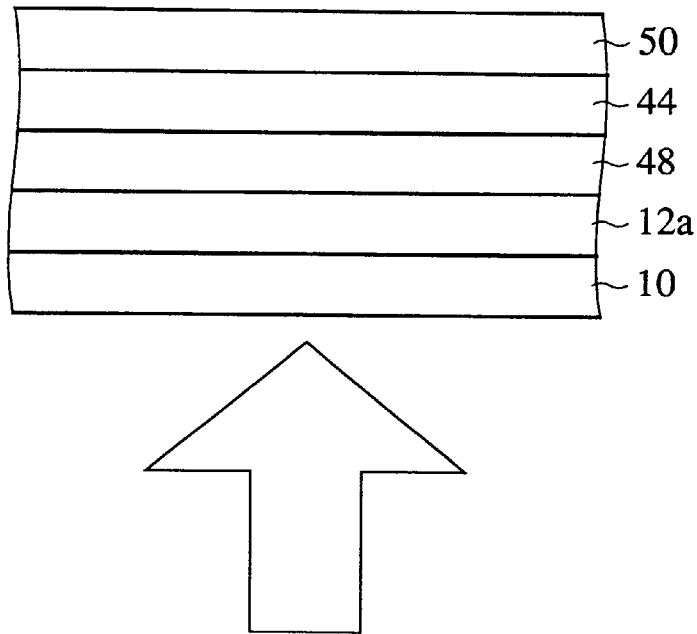
FIGS. 4A and 4B are sectional views of the liquid crystal display device, which show connection between a gate bus line and a drain electrode by laser beam application.
Figure 4B:
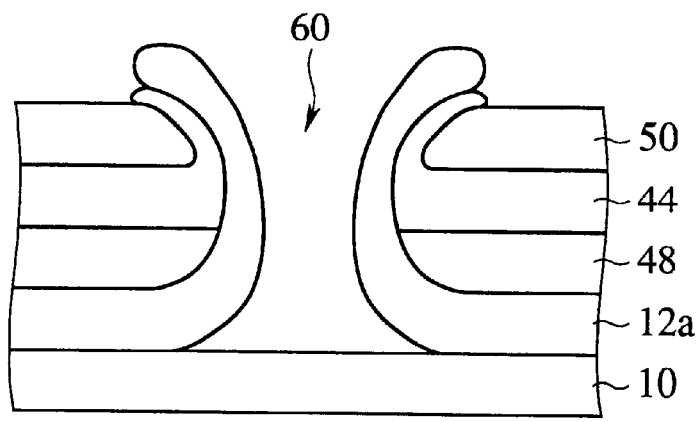
Figure 5:
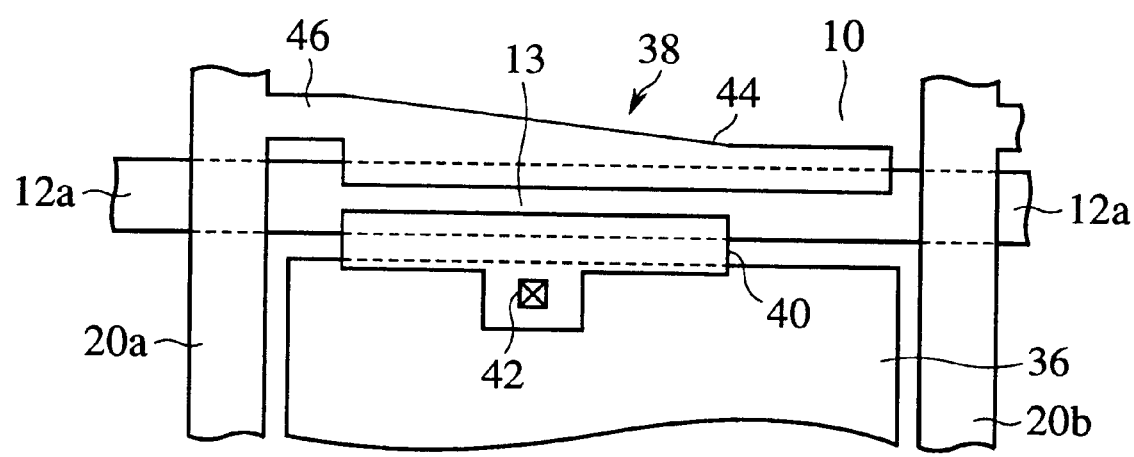
FIG. 5 is a plan view of a first additional example of the liquid crystal display device according to the first embodiment of the present invention.
Figure 6A:
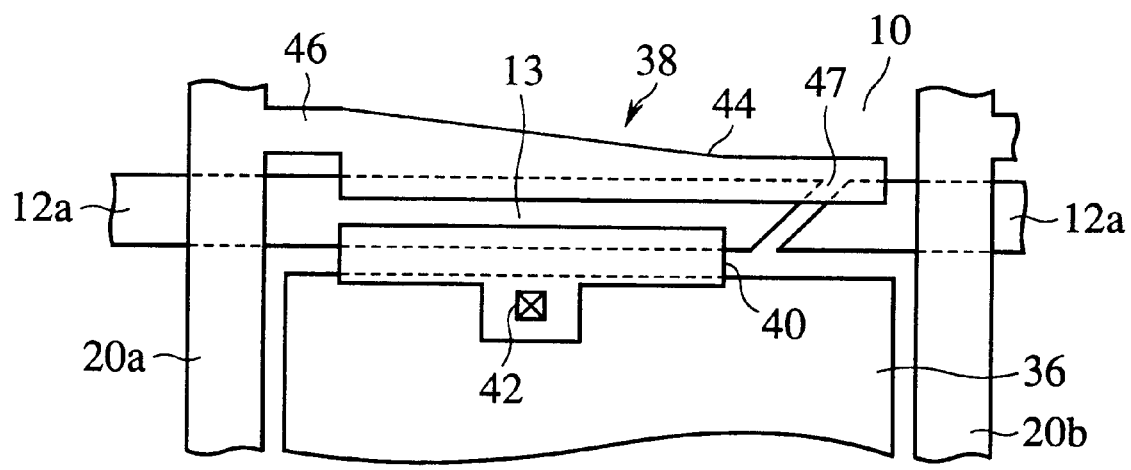
FIGS. 6A and 6B are plan views of the first additional example of the liquid crystal display device according to the first embodiment of the present invention, which show a repair process therefor.
Figure 6B:
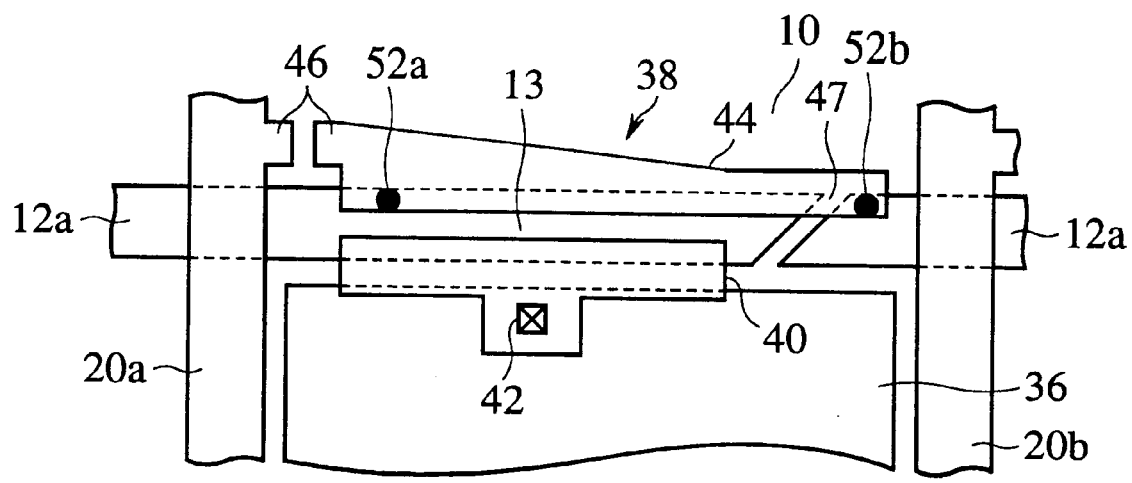
Figure 7A:
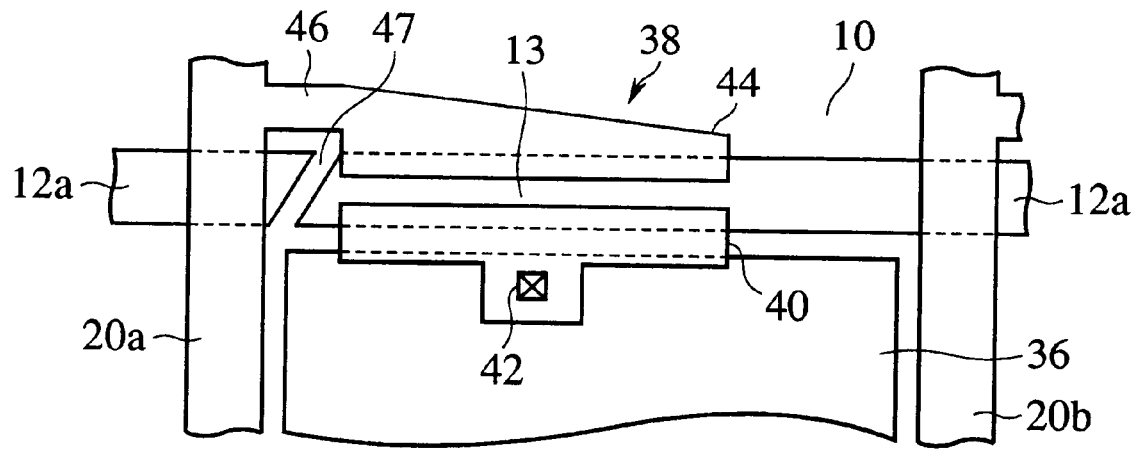
FIGS. 7A and 7B are plan views (Part 1) of a second additional example of the liquid crystal display device according to the first embodiment of the present invention, which show a repair process therefor.
Figure 8:
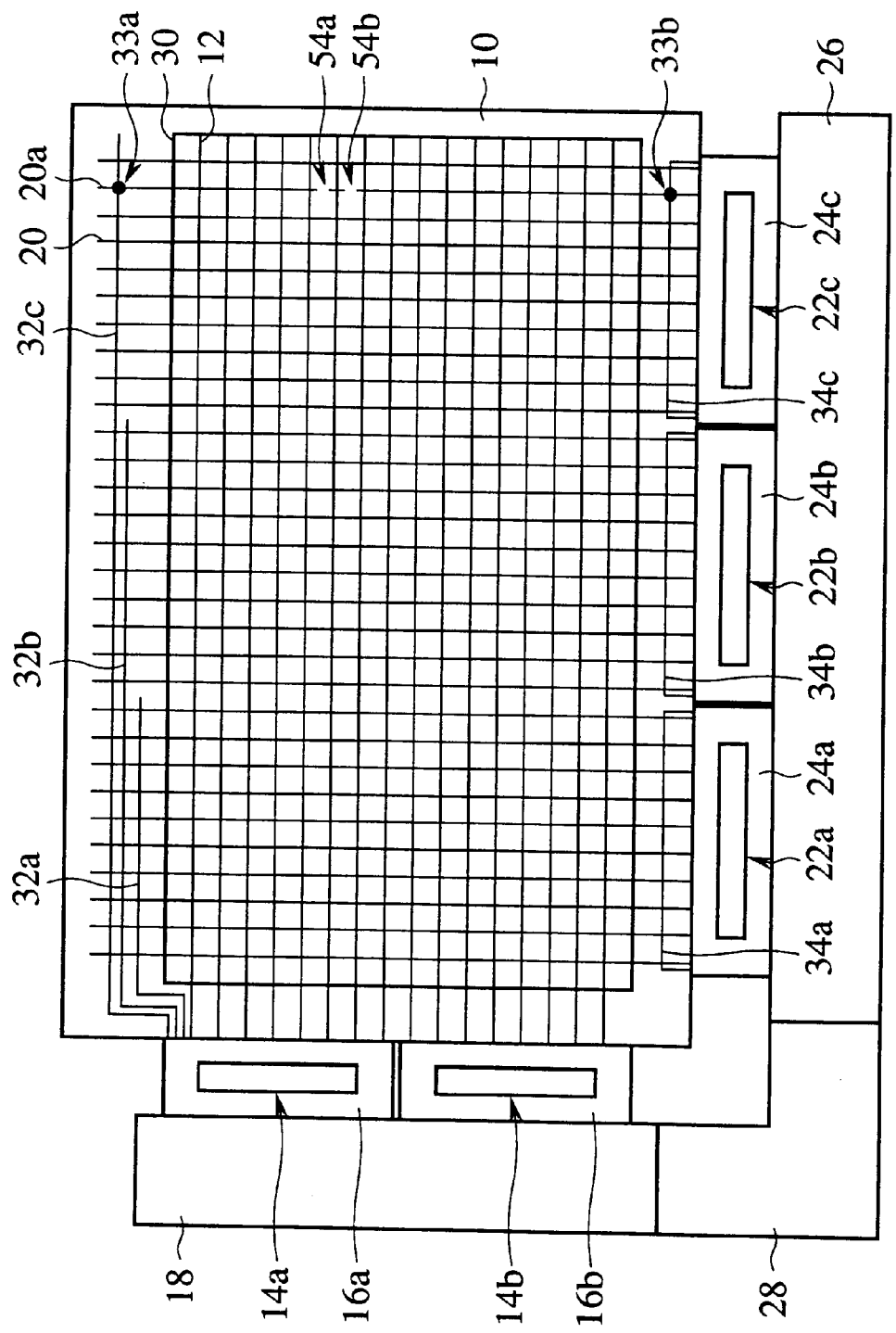
FIG. 8 is a plan view (Part 2) of the second additional example of the liquid crystal display device according to the first embodiment of the present invention, which show a repair process therefor.
Figure 9:
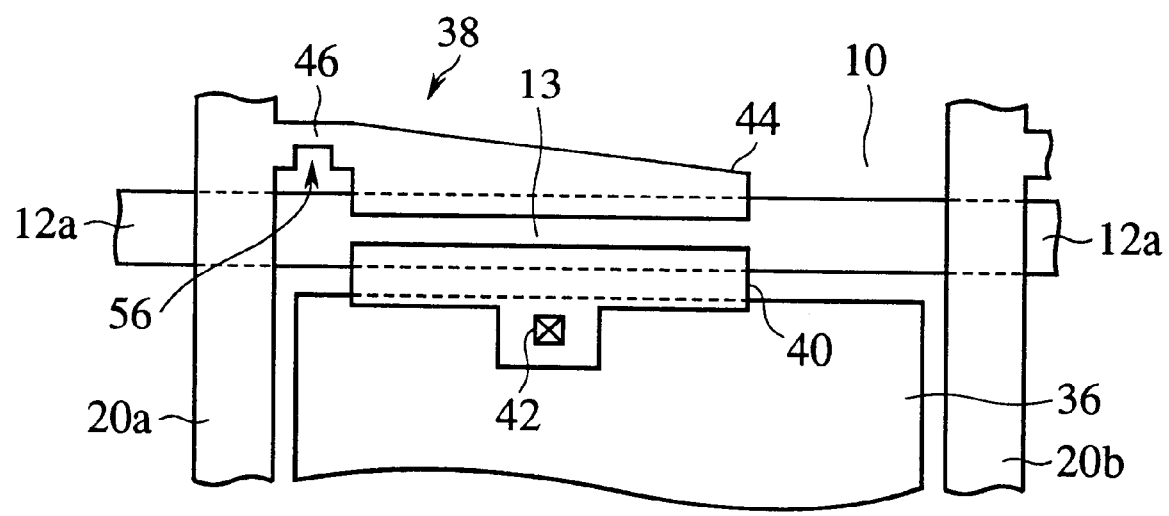
FIG. 9 is a plan view of a third additional example of the liquid crystal display device according to the first embodiment of the present invention.
Figure 10A:
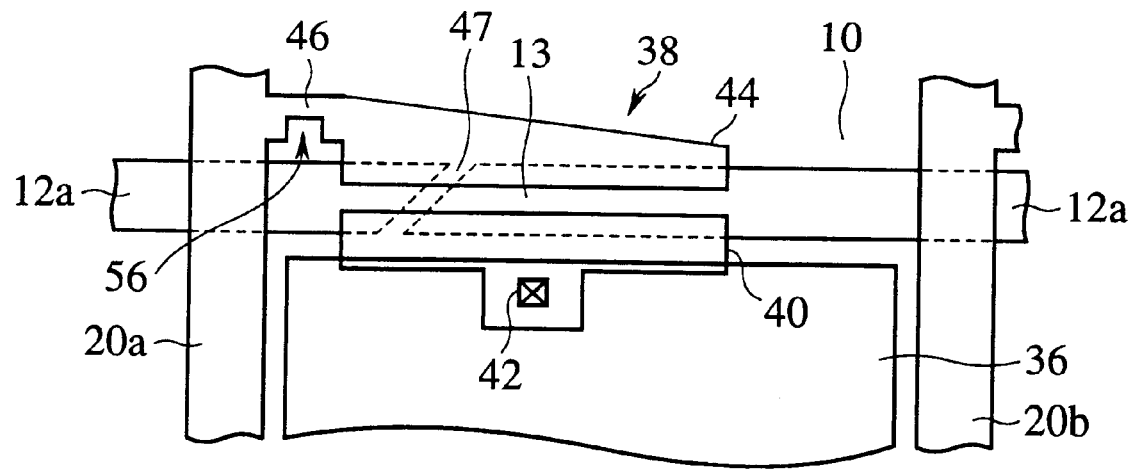
FIGS. 10A and 10B are plan views of the third additional example of the liquid crystal display device according to the first embodiment of the present invention, which show a repair process therefor.
Figure 10B:
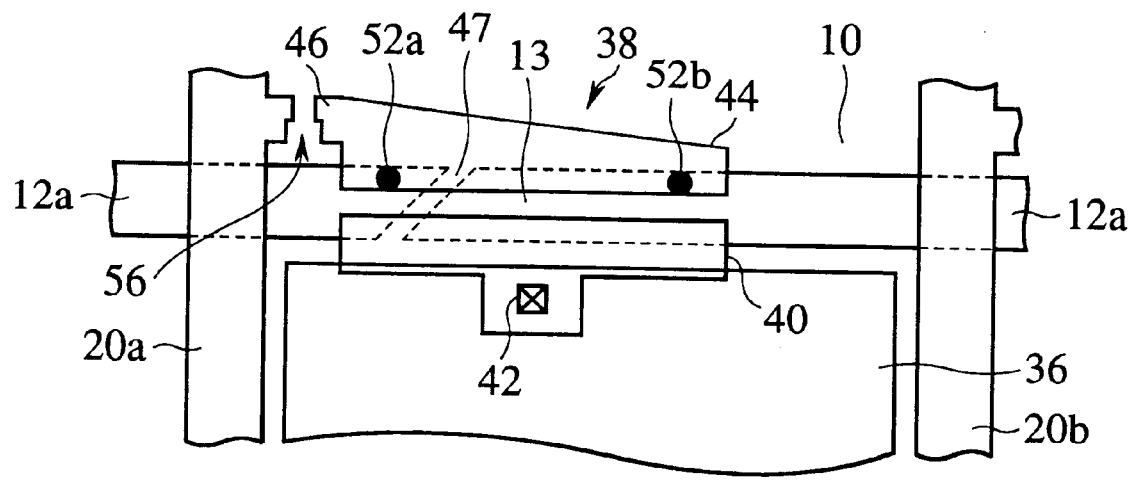
Figure 11:
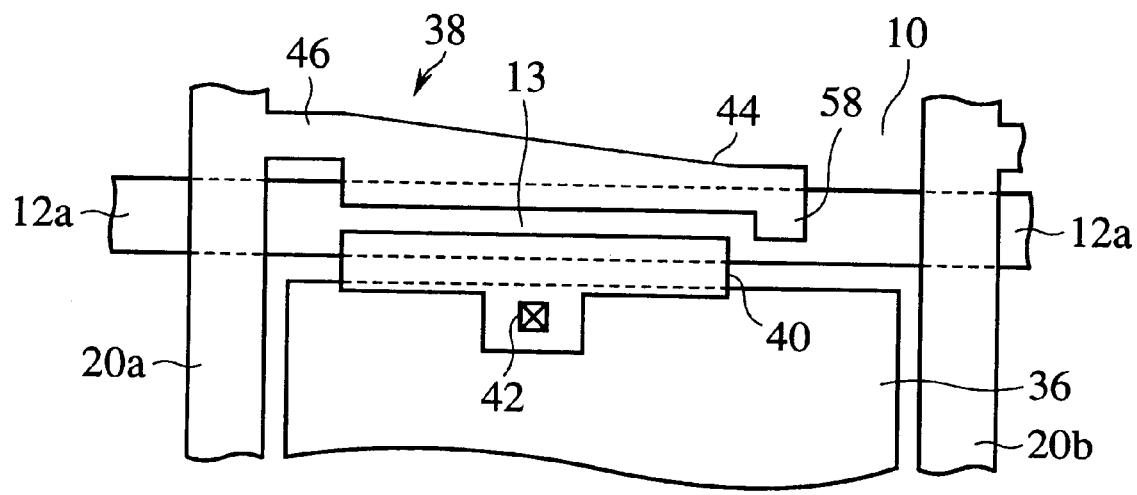
FIG. 11 is a plan view of a fourth additional example of the liquid crystal display device according to the first embodiment of the present invention.
Figure 12A:
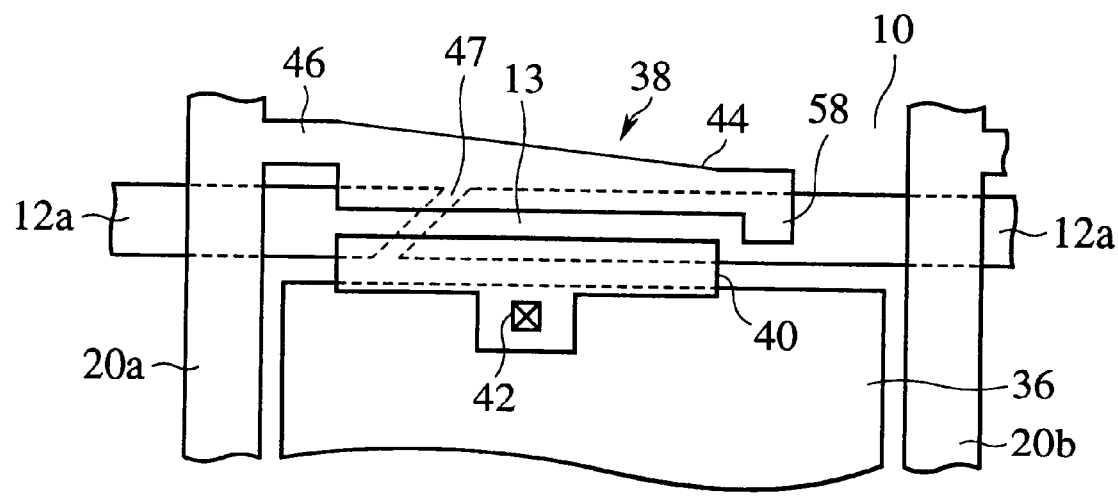
FIGS. 12A and 12B are plan views of the fourth additional example of the liquid crystal display device according to the first embodiment, which show a repair process therefor.
Figure 12B:
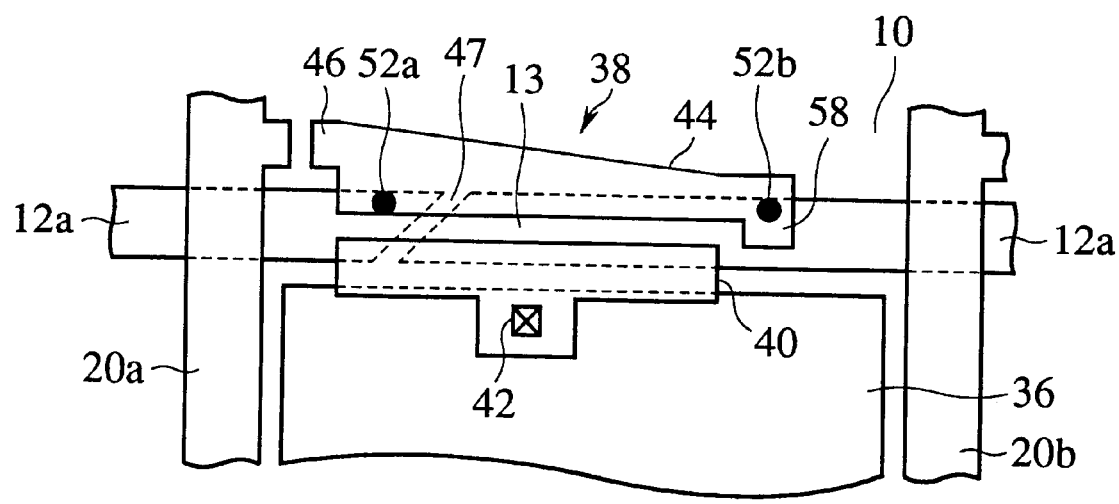

The liquid crystal display device according to a first embodiment of the present invention and a repair process therefor will be explained with reference to FIGS. 1 to 12B. FIG. 1 is a plan view of the liquid crystal display device according to a first embodiment of the present invention, which shows a general structure thereof. FIG. 2 is a plan view of the liquid crystal display device according to the present embodiment. FIGS. 3A to 3C are plan views of the liquid crystal display device according to the present embodiment, which show the repair process therefor. FIGS. 4A and 4B are sectional views of connection between a gate bus line and a drain electrode by laser beam application. FIG. 5 is a plan view of a first additional example of the liquid crystal display device according to the present embodiment. FIGS. 6A and 6B are plan views of the first additional example of the liquid crystal display device according to the present embodiment, which show the repair process therefor. FIGS. 7A to 8 are plan views of the repair process for a second additional example of the liquid crystal display device according to the present embodiment. FIG. 9 is a plan view of a third additional example of the liquid crystal display device according to the present embodiment. FIGS. 10A and 10B are plan views of the third additional example of the liquid crystal display device according to the present embodiment, which show the repair process therefor. FIG. 11 is a plan view of a fourth additional example of the liquid crystal display device according to the present embodiment. FIGS. 12A and 12B are plan view of the fourth additional example of the liquid crystal display device according to the present embodiment, which show the repair process therefor.

First, the general structure of the liquid crystal display device according to the present embodiment will be explained with reference to FIG. 1. FIG. 1 is a plan view of the liquid crystal display device according to the present embodiment, which shows the general structure thereof.

As shown in FIG. 1, a plurality of gate bus lines 12 are formed on a glass substrate 10, extended left to right as viewed in the drawing. A gate TAB 16a and a gate TAB 16b respectively having a gate driver 14a and a gate driver 14b formed in have one ends adhered to the left side of the glass substrate 10 as viewed in the drawing. The gate bus lines 12 are respectively connected to the outputs of the gate drivers 14a, 14b.

The gate TABs 16a, 16b have the other ends adhered to a print substrate 18, and the inputs of the gate drivers 14a, 14b are connected to a line (not shown) formed on the print substrate 18.

A plurality of data bus lines 20 are formed on the glass substrate 10, extended up to down as viewed in the drawing, crossing the gate bus lines 12. A data TAB 24a, a data TAB 24b and a data TAB 24c respectively having a data driver 22a, a data driver 22b and a data driver 22c formed in are adhered to the bottom side of the glass substrate 10 as viewed in the drawing. The data bus lines 20 are respectively connected to the outputs of the data drivers 22.

The data TABs 24a–24c have the other ends adhered to the print substrate 26, and the inputs of the data drivers 22a–22c are connected to a line (not shown) formed on the print substrate 26.

The lines (not shown) formed on the print substrates 18, 26 are connected to each other by a connection cable 28.

Outside a display region 30 there are formed a plurality of repair lines 32a, 32b, 32c and a plurality of repair lines 34a, 34b, 34c which cross the data bus lines 20.

That is, the repair lines 32a–32c are formed on an upper part of the display region 30, extended left to right as viewed in the drawing and crossing the data bus lines 20.

The repair line 32a is extended toward the right as viewed in the drawing, crossing all the data bus lines 20 connected to the data driver 22a, so that the repair line 32a can accommodate line disconnections of the data bus lines 20 connected to the data driver 22a of the data TAB 24a.

The repair line 32b is extended toward the right as viewed in the drawing, crossing all the data bus lines 20 connected to the data driver 22b, so that the repair line 32b can accommodate line disconnections of the data bus lines 20 connected to the data driver 22b of the data TAB 24b.

Similarly therewith, the repair line 32c is extended toward the right as viewed in the drawing, crossing all the data bus lines 20 connected to the data bus driver 22c, so that the repair line 32c can accommodate line disconnections of the data bus lines 20 connected to the data driver 22c of the data TAB 24c.

On the other hand, on a lower part of the display region 30 as viewed in the drawing, the repair line 34a is extended from the left end to the right end, as viewed in the drawing, of the data TAB 24a and crossing all the data bus lines 20 connected to the data driver 22a.

The repair line 34b is extended from the left side to the right side, as viewed in the drawing, of the data TAB 24b, crossing all the data bus lines 20 connected to the data driver 22b.

Similarly therewith, the repair line 34c is extended from the left end to the right end, as viewed in the drawing, of the data TAB 24c, crossing all the data bus lines 20 connected to the data driver 22c.

The repair lines 32a–32c and the repair lines 34a–34c are formed of the same conducting layer as the gate bus lines 12.

In such liquid crystal display device, when a line disconnection takes place in, e.g., a data bus line 20, the line disconnection can be repaired in the same way as in the conventional repair process by using the repair lines 32a–32c and the repair lines 34a –34c. However, as described above, it has been conventionally difficult to repair line disconnections of the gate bus lines 12 by using the repair lines.

The liquid crystal display device according to the present embodiment and the repair process therefor are characterized in that line disconnections of the gate bus lines which have been difficult to repair by the conventional repair process can be repaired. The liquid crystal display device according to the present embodiment and the repair process therefor will be detailed with reference to FIG. 2.

FIG. 2 is a plan view of the liquid crystal display device according to the present embodiment. FIG. 2 is an enlarged view of a part of the liquid crystal display device according to the present embodiment.

As shown in FIG. 2, a TFT 38 is formed upper of a picture element electrode 36 as viewed in the drawing.

The source electrode 40 of the TFT 38 is connected to the picture element electrode 36 through a contact hole 42, and the drain electrode 44 of the TFT 38 is connected to a data bus line 20a through a connection 46.

On the right side of the picture element electrode 36 as viewed in the drawing a data bus line 20b is formed in parallelism with the data bus line 20a. A gate bus line 12a normally crosses the data bus lines 20a, 20b and functions as the gate electrode 13 of the TFT 38.

In the liquid crystal display device according to the present embodiment the drain electrode 44 of the TFT 38 is formed, elongated along the gate bus line 12a left to right as viewed in the drawing. Generally, a left-to-right length of an amorphous silicon film (not shown), which functions as the channel of the TFT 38 is suitably formed in consideration of a number of the data bus lines 20, a load capacity of the TFT 38, etc. Generally, lengths of the drain electrode 44 and the source electrode 40 as well are set to have substantially the same length as a left-to-right length of the amorphous silicon film as viewed in the drawing.

In the present embodiment, however, a left-to-right length of the drain electrode 44 is not set to essentially have the same left-to-right length as the amorphous silicon film as viewed in the drawing but set, as required, to be larger than a left-to-right length of the amorphous silicon film as viewed in the drawing.

This allows for a larger repairable range in repairing a line disconnection of the gate bus line 12a as will be described below.

The drain electrode 44 is formed at least in a region which functions as the channel and occupies by above 50%, more preferably by above 90% that of a region between the data bus line 20a and the data bus line 20b, which does not function as the channel.

It is preferable that a left-to-right size of the drain electrode 44 has margins for photolithography, etching, etc.

In the liquid crystal display device according to the present embodiment a line disconnection of the gate bus line 12a is repaired by utilizing the drain electrode 44, and to this end the drain electrode 44 is formed elongated along the gate bus line 12a in the left-to-right direction as viewed in the drawing. In the liquid crystal display device according to the present embodiment a line disconnection is not repaired by utilizing the source electrode 40, and the source electrode 40 is not necessarily formed elongated in the left-to-right direction as viewed in the drawing.

Then, the repair process for the liquid crystal display device according to the present embodiment will be explained with reference to FIGS. 3A to 4B. FIGS. 3A to 3C are plan views of the liquid crystal display device, which shows the repair process for repairing a line disconnection of the gate bus line which has taken place in a region below the drain electrode. FIGS. 4A and 4B are sectional views of the liquid crystal display device, which shows connection between the gate bus line and the drain electrode by laser beam application.

Here it is assumed that, as exemplified in FIG. 3A, a line disconnection of the gate bus line 12a has taken place in a region below the drain electrode 44.

In a case of such line disconnection, laser beam application is performed at the side of the glass substrate 10 in a region in which the drain electrode 44 and the gate bus line 12a overlap each other, in a region which is left of the line disconnection part 47 as viewed in the drawing. The laser application on the side of the glass substrate 10 (see FIG. 4A) melts the gate bus line 12a, a gate insulation film 48, the drain electrode 44 and an insulation film 50. When the laser beam application is finished, the gate bus line 12a, the drain electrode 44, etc. solidify. Thus the gate bus line 12a and the drain electrode 44 are connected to each other (see FIG. 4B).

As shown in FIG. 3B, the gate bus line 12a and the drain electrode 44 are thus electrically connected to each other on the left side of the line disconnected part 47 as viewed in the drawing.

In the same way, laser beam application is performed on the side of the glass substrate 10 to a region of the region where the drain electrode 44 and the gate bus line 12a overlap each other, which (a region) is on the right side of the line disconnected part 47 as viewed in the drawing. This laser beam application electrically connects the gate bus line 12a and the drain electrode 44 in the region on the right side of the line disconnected part 47 as viewed in the drawing.

Connected regions 52a, 52b between the gate bus line 12a and the drain electrode 44 are shown, blacked out.

Thus, the drain electrode 44 is connected to that of the gate bus line 12a on the left side of the line disconnected part 47 as viewed in the drawing and is connected to that of the gate bus line 12a on the right side of the line disconnected part 47, and the disconnected gate bus line 12a is brought into connection by the drain electrode 44 and repaired.

In this state, however, the gate bus line 12a is short-circuited with the data bus line 20a through the drain electrode 44 and the connection 46.

Here, as shown in FIG. 3C, laser beam application is performed to the connection 46 to disconnect the connection 46, whereby the drain electrode 44 and the data bus line 20a are disconnected from each other. Thus, the short circuit between the gate bus line 12a and the gate bus line 20a is prevented.

With the gate bus line 12a having the line disconnection thus repaired, the drain electrode 44 is disconnected from the data bus line 20a, and the TFT 38 cannot operate as required. Accordingly, picture elements associated with the TFT 38 cause point defects in display. However, a small number of point defects is allowable in terms of product specifications of a liquid crystal display device and causes no problem.

With the gate bus line 12a having the line disconnection repaired, a resistance of the drain electrode 44 is inserted between resistances of the disconnected gate bus line 12a.

However, generally the drain electrode 44 is formed of metal layer, and the metal layer has a very small resistance value. In a 21-type SXGA (Super extended video Graphics Array) panel, for example, a resistance value of the full length of one gate bus line 12a is about 10–20 kΩ while a resistance value of the drain electrode 44 is about 100Ω at largest.

That is, a resistance value of the drain electrode 44 is ignorably sufficiently small in comparison with that of the gate bus line 12a. A resistance value of the drain electrode 44 is so smaller than, even when the gate bus line 12a has a line disconnection repaired that of the gate bus line 12a, a signal waveform of the repaired gate bus line 12a is substantially the same that of the original gate bus line 12a.

Thus, the liquid crystal display device according to the present embodiment can be sufficiently practical.

Next, additional examples of the liquid crystal display device according to the present embodiment and the repair process therefor will be explained.

A First Additional Example

First, a first additional example of the liquid crystal display device according to the present embodiment and the process therefor will be explained with reference to FIGS. 5 to 6B. FIG. 5 is a plan view of the first additional example of the liquid crystal display device according to the present embodiment. FIGS. 6A and 6B are plan views of the first additional example of the liquid crystal display device according to the present embodiment, which show the repair process therefor.

As shown in FIG. 5, in the present example, the drain electrode 44 is extended from the vicinity of the data bus line 20a on the left side as viewed in the drawing to the vicinity of the data bus line 20b on the right side as viewed in the drawing.

The drain electrode 44 is formed along the gate bus line 12a in a wide left-to-right range as viewed in the drawing, which allows for a wide range in which the gate bus line 12a can be repaired.

Then, the repair process for the liquid crystal display device of the present example will be explained with reference to FIGS. 6A and 6B.

Here it is assumed that, as exemplified in FIG. 6A, the drain electrode 44 has a line disconnection in a region which is a little left of the right end of the thereof as viewed in the drawing.

When the gate bus line 12a has such line disconnection, laser beams are applied on the side of the glass substrate 10 to that of a region in which the drain electrode 44 and the gate bus line 12a overlap each other, which is on the left side of the line disconnected part 47 as viewed in the drawing, and to that of the region, which is on the right side of the line disconnected part 47 as viewed in the drawing.

Such laser beam application electrically connects the gate bus line 12a and the drain electrode 44, as shown in FIG. 6B, in a connection region 52a on the left side of the line disconnected part 47 as viewed in the drawing and in a connection region 52b on the right side of the line disconnected part 47 as viewed in the drawing.

Then, for the prevention of short-circuit between the gate bus line 12a and the data bus line 20a laser beams are applied to the connection 46 to thereby undo the connection 46.

Thus, the liquid crystal display device of the first additional example can be repaired.

As described above, in the present example, the drain electrode 44 is extended from the vicinity of the data bus line 20a on the left side as viewed in the drawing to the vicinity of the data bus line 20b on the right side as viewed in the drawing. A region in which the gate bus line 12a can be repaired can be accordingly wider.

A Second Additional Example

Then, a second additional example of the liquid crystal display device according to the present embodiment and the repair process therefor will be explained with reference to FIGS. 7A to 8. FIGS. 7A to 8 are plan views of the second additional example of the liquid crystal display device according to the present embodiment, which show the repair process.

The liquid crystal display device of the present example is the same as the liquid crystal display device according to the present embodiment shown in FIG. 2, and is not explained here.

As exemplified in FIG. 7A, the gate bus line 12a is disconnected in a region other than the region below the drain electrode 44. Specifically, it is assumed that the gate bus line 12a is disconnected in a region between the left end of the drain electrode 44 as viewed in the drawing and the data bus line 20a on the left side as viewed in the drawing.

When the gate bus line 12a has such line disconnection, even though laser beam application respectively on the left end and on the right end of the drain electrode 44 as viewed in the drawing electrically connects the drain electrode 44 and the gate bus line 12a to each other, the line disconnection of the gate bus line 12a cannot be repaired.

Figure 7B:
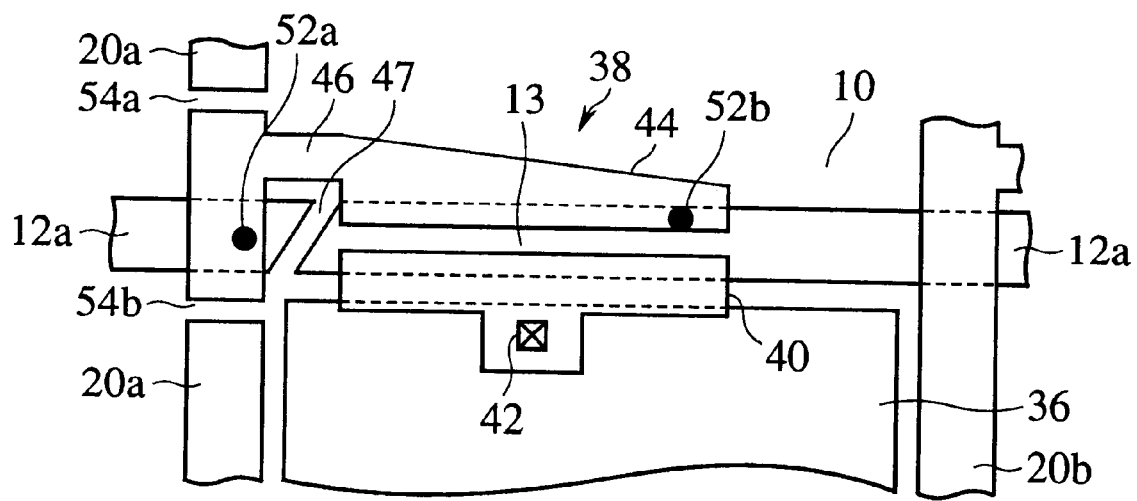

Here, as shown in FIGS. 7A and 7B, the data bus line 20a and the gate bus line 12a are connected to each other by laser beam application in a region in which the gate bus line 12a on the left side of the line disconnected part 47 as viewed in the drawing and the data bus line 20a cross each other, and the gate bus line 12a on the right side of the line disconnected part as viewed in the drawing and the drain electrode 44 are connected to each other by laser beam application.

Then, the data bus line 20a is disconnected in regions upper and lower of the connection region 52a as viewed in the drawing, in which the gate bus line 12a and the data bus line 20a are connected to each other. Thus, the data bus line 20a is disconnected at the line disconnected part 54a and the line disconnected part 54b.

Thus, the disconnected gate bus line 12a can be repaired.

However, in thus repairing the line disconnection of the gate bus line 12a, the data bus line 20a is disconnected at the line disconnected part 54a and the line disconnected part 54b, and the data bus line 20a is disconnected.

Then, in this case, the disconnected data bus line 20a is repaired by utilizing the repair lines 32a–32c, 34a–34c.

That is, when the data bus line 20a is disconnected at the line disconnected parts 54a, 54b as shown in FIG. 8, that of the data bus line 20a which is upper of the line disconnected part 54a as viewed in the drawing and the repair line 32c are connected to each other by laser beam application, and that of the data bus line 20a which is lower of the line disconnected part 54b and the repair line 34c are connected to each other by laser beam application. In FIG. 8 the connected regions 33a, 33b formed by the laser beam application are blacked out.

The repair line 32c and the repair line 34c are connected to each other through lines (not shown) formed on the print substrates 18, 26 and the cable 28 as described above, and the line disconnection of the data bus line 20a can be accordingly repaired.

As described above, according to the present example, even when the gate bus line is disconnected in a region other than the region lower of the drain electrode, the disconnection of the gate bus line can be repaired.

A Third Additional Example

Then, a third additional example of the liquid crystal display device according to the present embodiment and the process for repairing the same will be explained with reference to FIGS. 9 to 10B. FIG. 9 is a plan view of the third additional example of the liquid crystal display device according to the present embodiment. FIGS. 10A and 10B are plan views of the third additional example of the liquid crystal display device according to the present embodiment, which show the repair process for the same.

As shown in FIG. 9, in the present example, a notch 56 is formed in the connection 46 between the drain electrode 44 and the data bus line 20a, and the notch 56 partially thins the connection 46. The notch 56 permit the connection 46 to be cut off in a short period of time. The notch 56 is apparently indicative of a part of the connection 46 to be cut off, which improves processing efficiency.

Then, the repair process of the liquid crystal displayed device of the present example will be explained with reference to FIG. 10.

It is assumed that as shown in FIG. 10A, the gate bus line 12a has a line disconnection in a region below the drain electrode 44.

The line disconnection of the gate bus line 12a, which is in a region below the drain electrode 44, is repaired by the same repair process as the repair process for the liquid crystal display device shown in FIG. 3B.

Then, to disconnect the drain electrode 44 from the data bus line 12a the connection 46 is disconnected at the notch 56, where the connection 46 is thinned, is disconnected by laser beam application. The notch 56, which is formed between the drain electrode 44 and the data bus line 12a, permits the connection 46 to be cut off in a short period of time. Furthermore, the notch 56 apparently defines a region where the connection 46 is to be cut off, which can improve processing efficiency of the disconnection processing.

As described above, in the present example, because of the notch formed between the drain electrode and the data bus line, the connection can be disconnected for a short period of time.

In addition, because of the notch, which apparently defines a region of the connection to be disconnected, high processing efficiency of the disconnection processing can be obtained.

A Fourth Additional Example

A fourth additional example of the liquid crystal display device according to the present embodiment and the repair process therefor will be explained with reference to FIGS. 11 to 12B. FIG. 11 is a plan view of the fourth additional example of the liquid crystal display device according to the present embodiment. FIG. 12 is plan views of the fourth additional example of the liquid crystal display device according to the present embodiment, which show the repair process therefor.

As shown in FIG. 11, a pad 58 opposed to the gate bus line 12 is formed on the right end of the drain electrode 44 as viewed in the drawing.

As shown in FIG. 4B, the connection between the drain electrode 44 and the gate bus line 12a is performed around a hole 60 formed by laser beam application. Accordingly, it is preferable to ensure the connection between the drain electrode 44 and the gate bus line 12a that a region in which the drain electrode 44 and the gate bus line 12a are opposed to each other is larger than the hole 60 formed by the laser beam application.

In the present example, the pad 58 is shaped larger than the hole 60 formed by the laser beam application, whereby the connection between the gate bus line 12a and the drain electrode 44 by the laser beam application can be more ensured.

The pad 58 formed on the drain electrode 44 facilitates alignment for the laser beam application, which can improve processing efficiency of the laser beam application.

Next, the repair processing for the liquid crystal display device of the present example will be explained with reference to FIGS. 12A and 12B.

It is assumed that, as shown in FIG. 12A, the gate bus line 12a is disconnected in a region below the region where the drain electrode 44 is formed.

When the gate bus line 12a is thus disconnected, that of the gate bus line 12a on the left side of the line disconnected part 47 as viewed in the drawing, and the drain electrode 44 are connected to each other by laser beam application, and that of the gate bus line 12b on the right side of the line disconnected part 47 as viewed in the drawing, and the pad 58 are connected to each other by laser beam application.

Thus the disconnected gate bus line 12a can be repaired.

As described above, in the present example, because of the pad formed on the end of the drain electrode the connection by the laser beam application can be ensured, and in addition, alignment of the laser beam application is facilitated, with a result of improved processing efficiency.

A Second Embodiment

Figure 13:
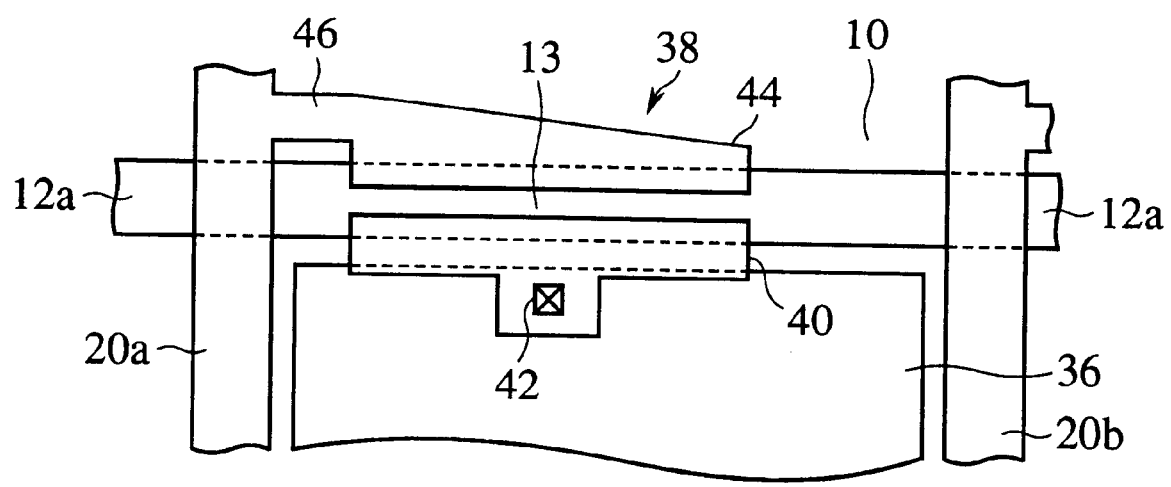
FIG. 13 is a plan view of the liquid crystal display device according to a second embodiment of the present invention.

The liquid crystal display device according to a second embodiment of the present invention and the repair process for the liquid crystal display device will be explained with reference to FIGS. 13 to 16B. FIG. 13 is a plan view of the liquid crystal display device according to the present embodiment. FIG. 14 is plan views of the liquid crystal display device according to the present embodiment, which show the repair process therefor. FIG. 15 is a plan view of an example of the liquid crystal display device according to the present embodiment. FIG. 16 is a plan view of the example of the liquid crystal display device according to the present embodiment, which show the repair process therefor. The same members of the present embodiment as those of the liquid crystal display device according to the first embodiment and the repair process therefor are represented by the same reference numbers not to repeat or to simplify their explanation.

The general structure of the liquid crystal display device according to the present embodiment is the same as that of the liquid crystal display device according to the first embodiment, and its explanation is omitted.

The liquid crystal display device according to the present embodiment and the repair process therefor are characterized in that a source electrode is utilized to repair a line disconnection of a gate bus line.

As shown in FIG. 13, the liquid crystal display device according to the present embodiment is substantially the same as the liquid crystal display device according to the first embodiment shown in FIG. 2 but is characterized in that the source electrode 40 is formed extended along a gate bus line 12a left-to-right as viewed in the drawing for the purpose of utilizing the source electrode 40 to repair a line disconnection of the gate bus line 12a, and the drain electrode 44 is not necessarily formed elongated in the left-to-right direction as viewed in the drawing.

Then, the liquid crystal display device according to the present embodiment and the repair process for the liquid crystal display device will be explained with reference to FIG. 14.

Figure 14A:
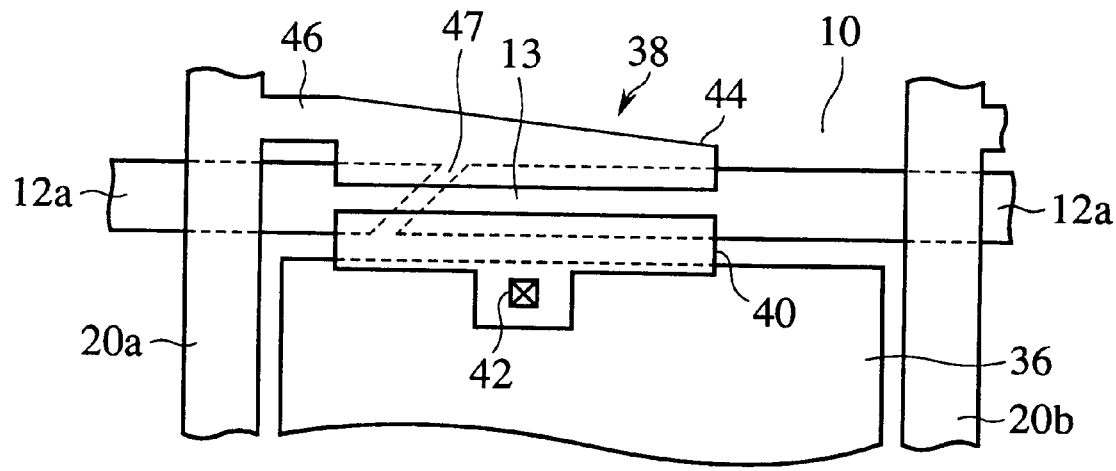
FIGS. 14A and 14B are plan views of the liquid crystal display device according to the second embodiment of the present invention, which show a repair process therefor.
Figure 15:
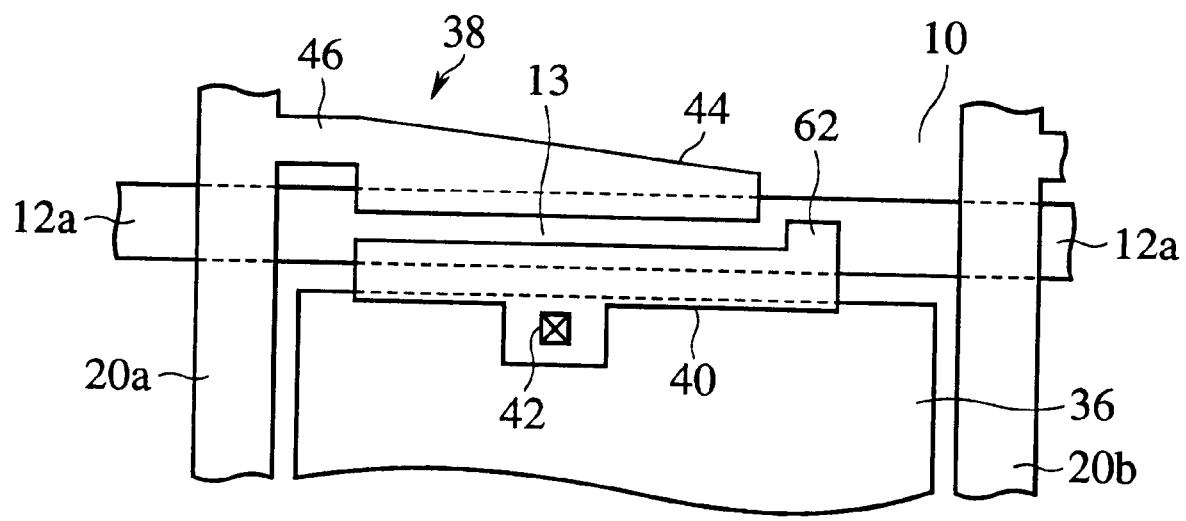
FIG. 15 is a plan view of an additional example of the liquid crystal display device according to the second embodiment of the present invention.

It is assumed that, as shown in FIG. 14A, the gate bus line 12a is disconnected in a region below a region where the source electrode 40 is formed.

Figure 14B:
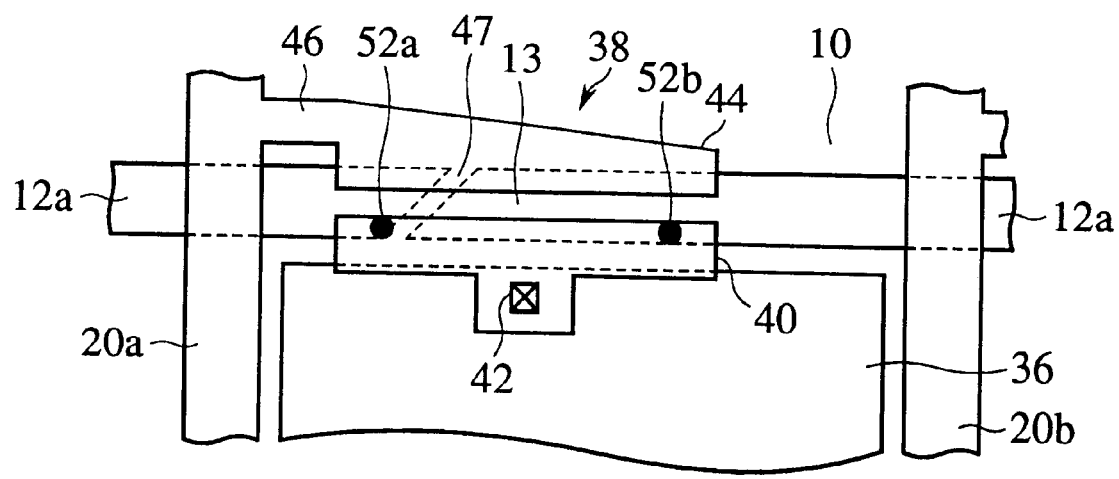

When the gate bus line 12a is thus disconnected, as shown in FIG. 14B that of the gate bus line 12a on the left side of the line disconnected part 47 as viewed in the drawing, and the source electrode 40 are connected to each other by laser beam application. That of the gate bus line 12a on the right side of the line disconnected part 47 as viewed in the drawing, and the source electrode 40 are connected to each other by laser beam application.

Thus, the disconnected gate bus line 12a can be repaired.

In the present embodiment, to repair a disconnection of the gate bus line 12a the drain electrode 44 is not used, but the source electrode 40 is utilized, whereby it is not necessary to disconnect the drain electrode 44 and the data bus line 20a at the connection 46.

Accordingly, according to the present embodiment a line disconnection of the gate bus line 12a can be repaired by the simpler process than in the first embodiment.

The source electrode 40 as well as the drain electrode 44 has small resistance value. Accordingly, a change of a signal of the gate bus line 12a due to insertion of a resistance of the source electrode 40 between resistances of those of the disconnected gate bus line 12a is ignorable. Accordingly, a line disconnection of the gate bus line is repaired by the repair process for the liquid crystal display device according to the present embodiment, whereby the liquid display device can have sufficient display performance.

As described above, according to the present embodiment, a line disconnection of the gate bus line is repaired by utilizing the source electrode without utilizing the drain electrode, whereby it is not necessary to disconnect the drain electrode from the data bus line, and accordingly the line disconnection can be repaired by the simple processing.

Example

Then, an example of the liquid crystal display device according to the present embodiment and the repair process for the liquid crystal display device will be explained with reference to FIGS. 15 to 16B.

The liquid crystal device of the present embodiment is characterized in that a pad 62 opposed to the gate bus line 12a is formed on the source electrode 40. That is, as shown in FIG. 15, the pad 62 is formed on the right end of the source electrode 40 as viewed in the drawing, opposed to the gate bus line 12a. For the above-described reason, the pad 62 is shaped larger than a hole 60 formed by laser beam application.

In the present example the pad 62 opposed to the gate bus line 12a is formed on the end of the source electrode 40, which further ensures the connection by the laser beam application. Alignment for the laser beam application is also facilitated, with a result of improved processing efficiency.

Then, the repair process for the liquid crystal display device of the present embodiment will be explained with reference to FIGS. 16A and 16B.

Figure 16A:
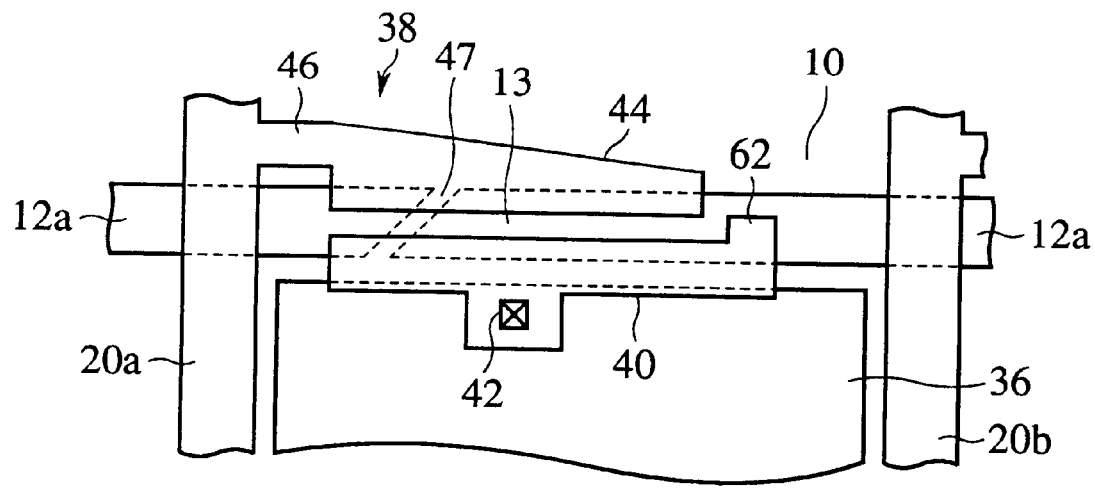
FIGS. 16A and 16B are plan views of the additional example of the liquid crystal display device according to the second embodiment, which show a repair process therefor.
Figure 16B:
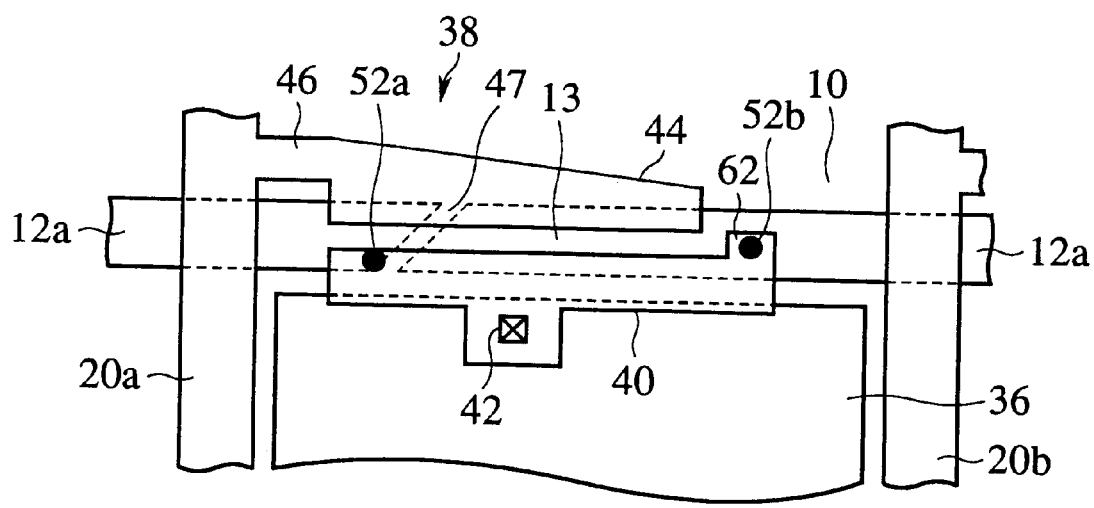

It is assumed that, as shown in FIG. 16A, a line disconnection of the gate bus line 12a has taken place in a region below the region where the source electrode 40 is formed.

When such line disconnection of the gate bus line 12a is present, that of the gate bus line 12a on the left side of the line disconnected part 47 as viewed in the drawing, and the source electrode 40 are connected to each other by laser beam application, and that of the gate bus line 12a on the right side of the line disconnected part 47 as viewed in the drawing, and the pad 62 are connected to each other by laser beam application.

The line disconnection of the gate bus line 12a is thus repaired.

As described above, according to the present embodiment, because of the pad formed on the end of the source electrode, opposed to the gate bus line, the connection by the laser beam application can be further ensured. Alignment of the laser beam application is also facilitated, which can improve processing efficiency.

A Third Embodiment

Figure 17:
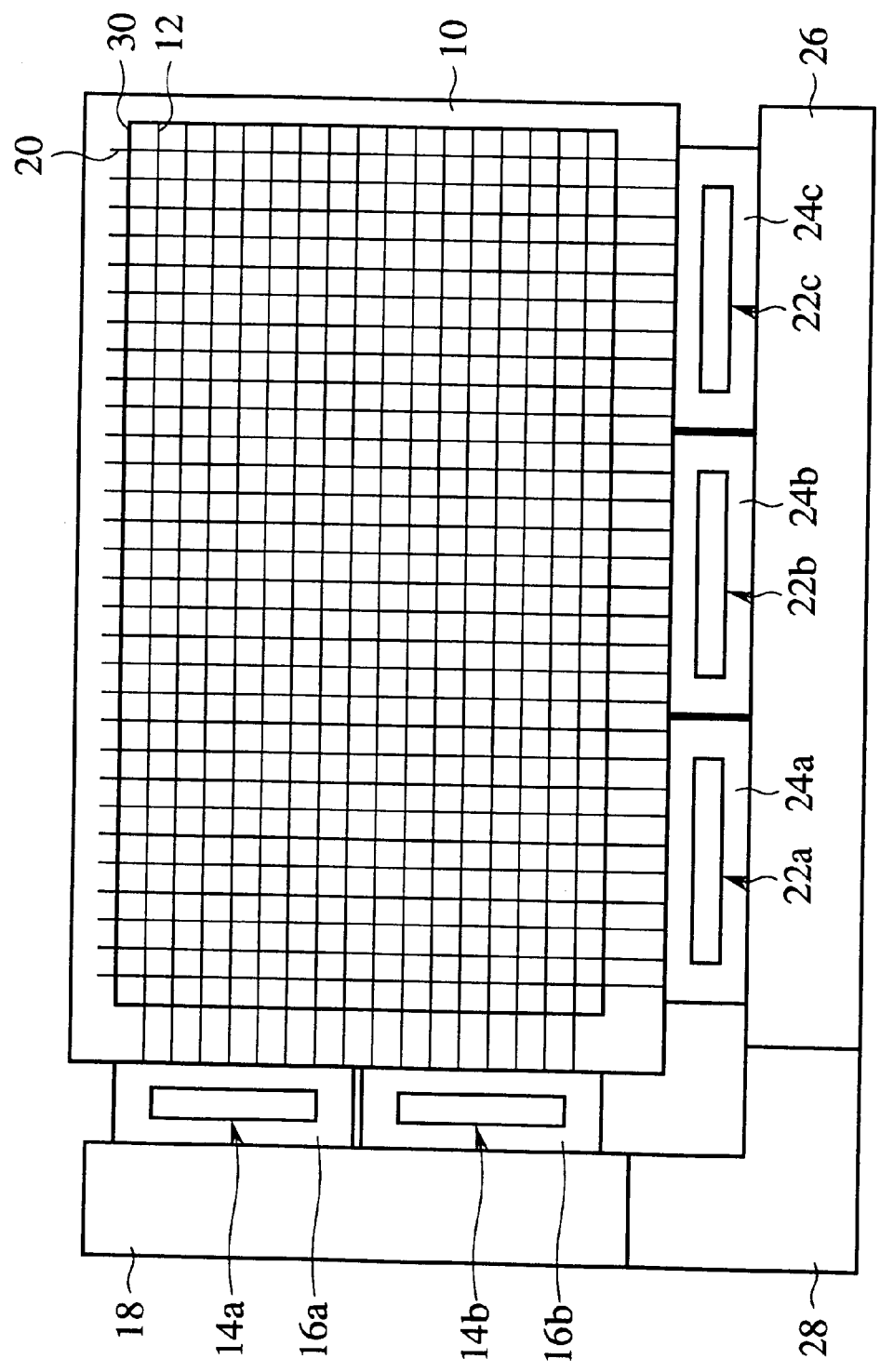
FIG. 17 is a plan view of the liquid crystal display device according to a third embodiment of the present invention, which shows a general constitution thereof.
Figure 18:
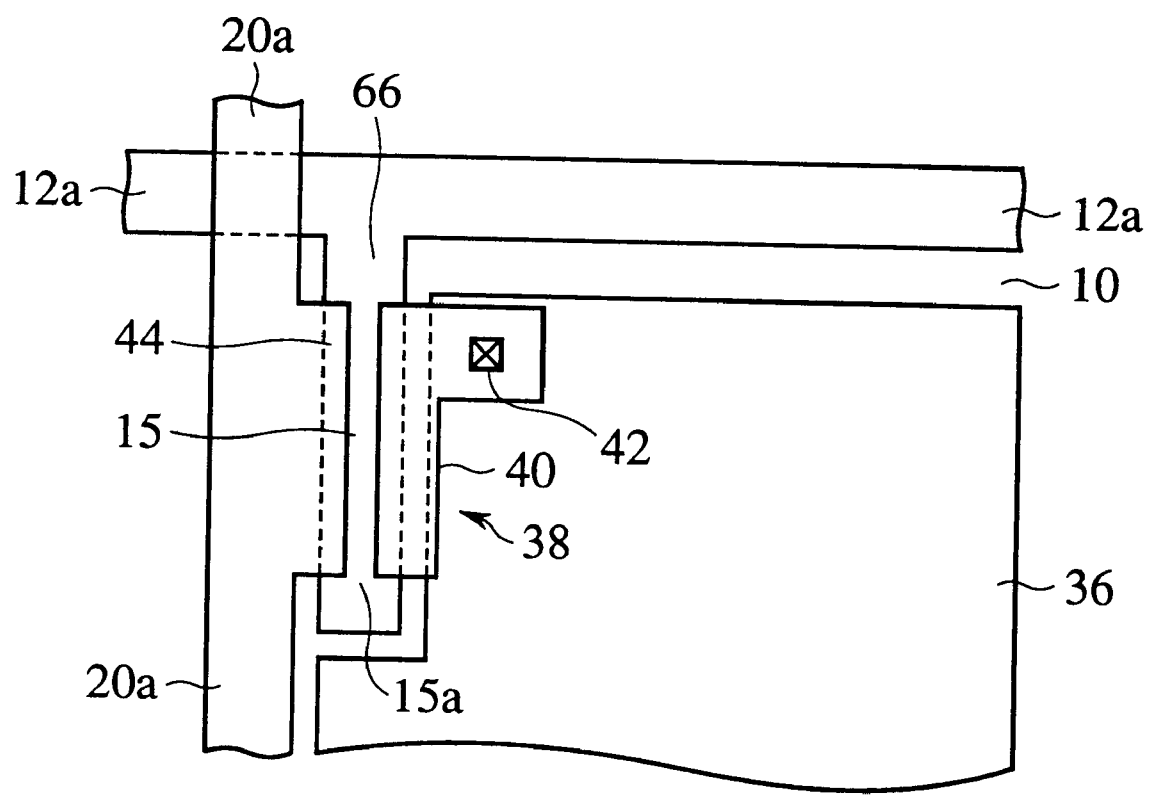
FIG. 18 is a plan view of the liquid crystal display device according to the third embodiment of the present invention.
Figure 19A:
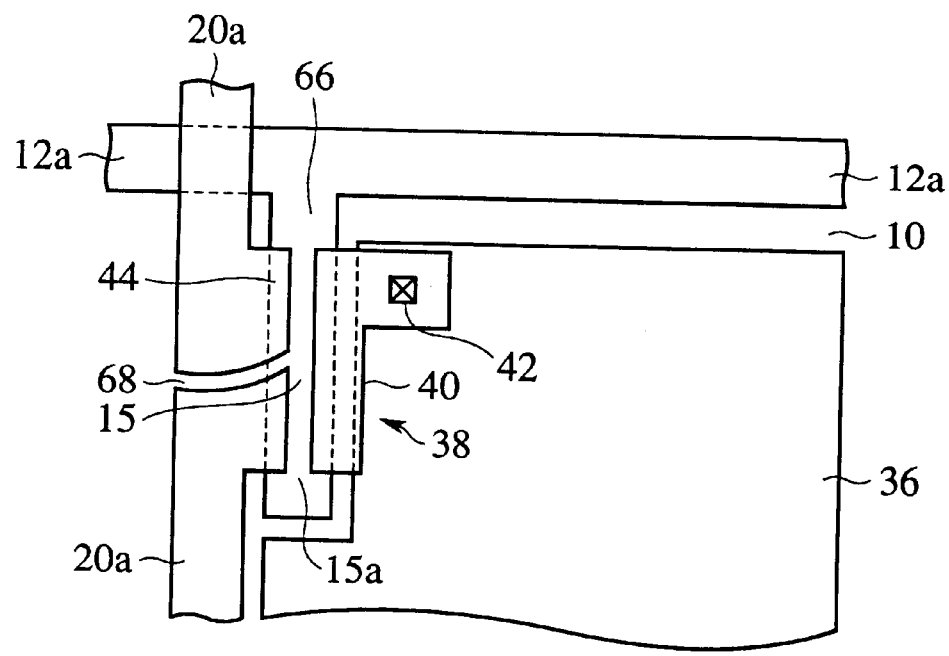
FIGS. 19A and 19B are plan views of the liquid crystal display device according to the third embodiment of the present invention, which show a repair process therefor.
Figure 19B:
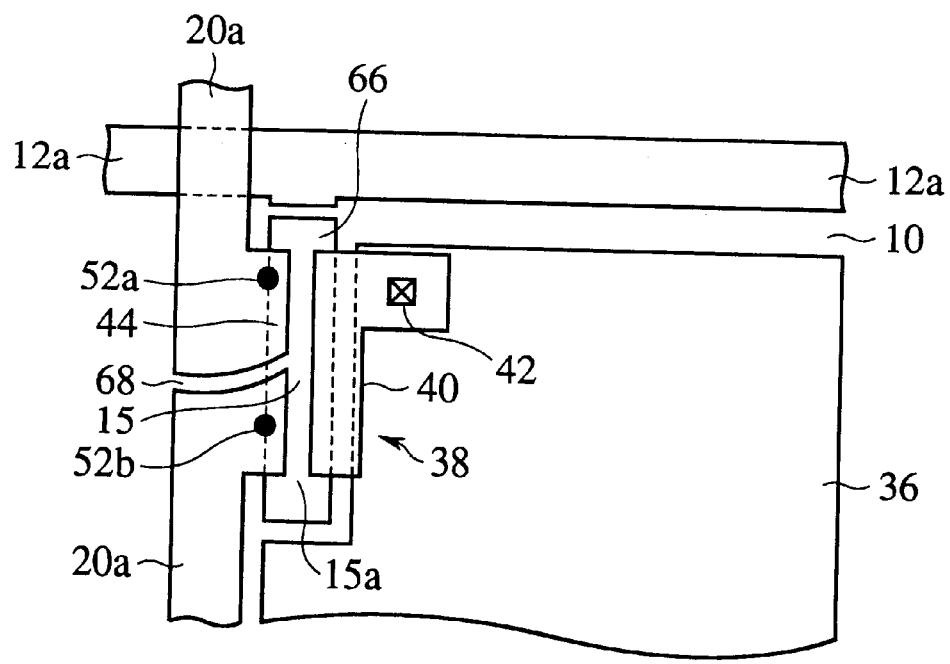
Figure 20:
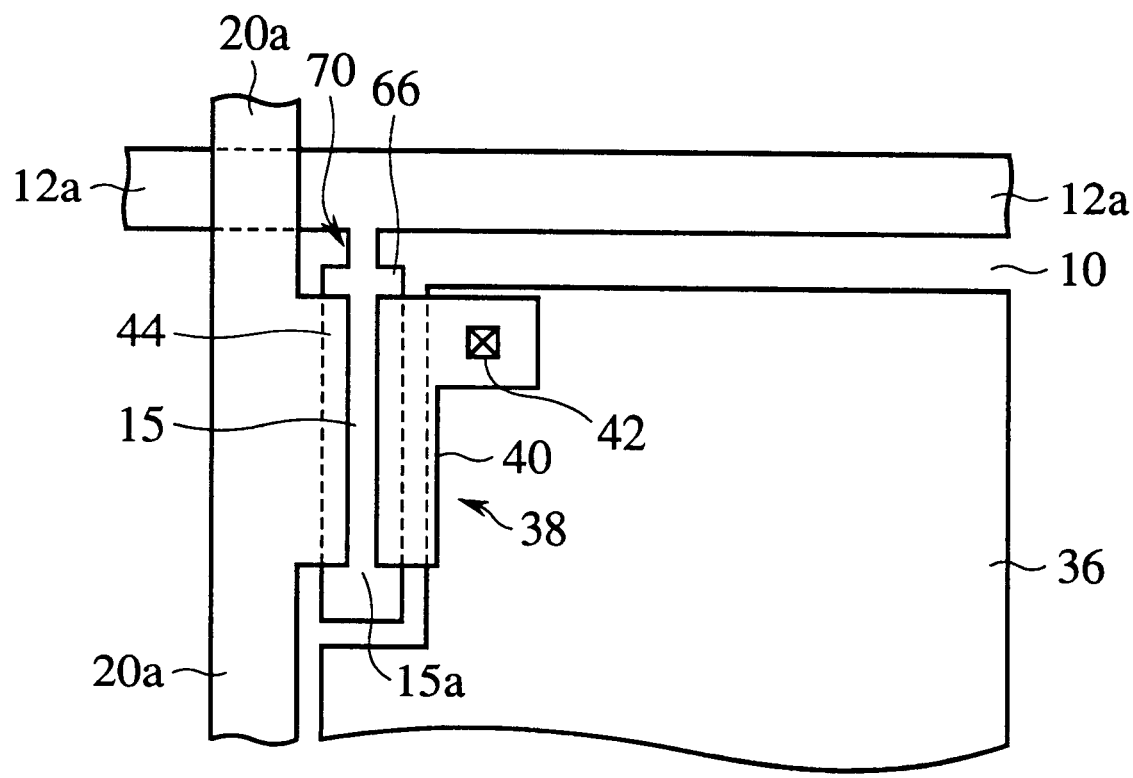
FIG. 20 is a plan view of a first additional example of the liquid crystal display device according to the third embodiment of the present invention.
Figure 21A:
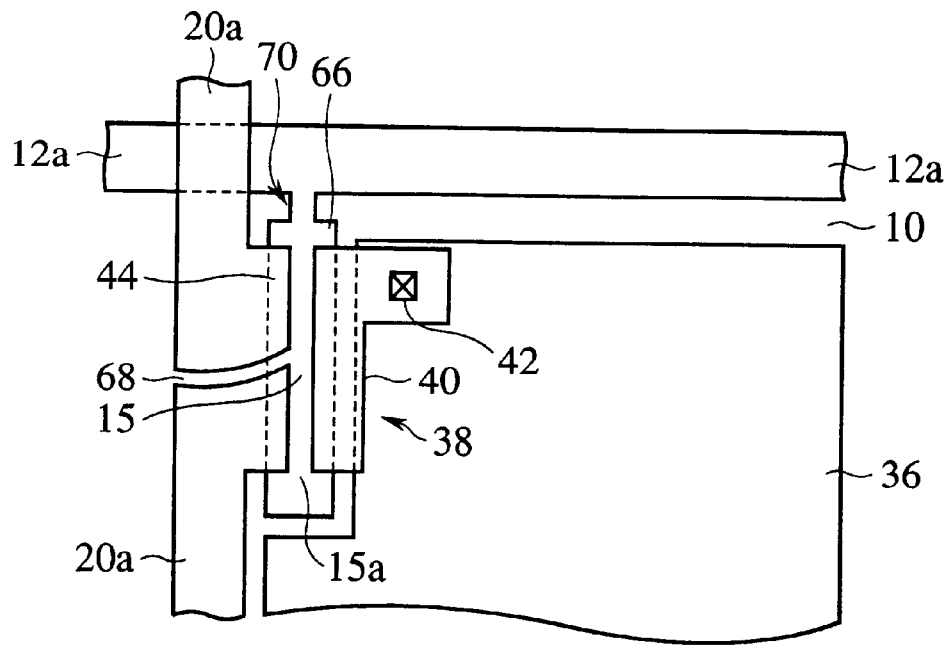
FIGS. 21A and 21B are plan views of the first additional example of the liquid crystal display device according to the third embodiment of the present invention, which shows a repair process therefor.
Figure 21B:
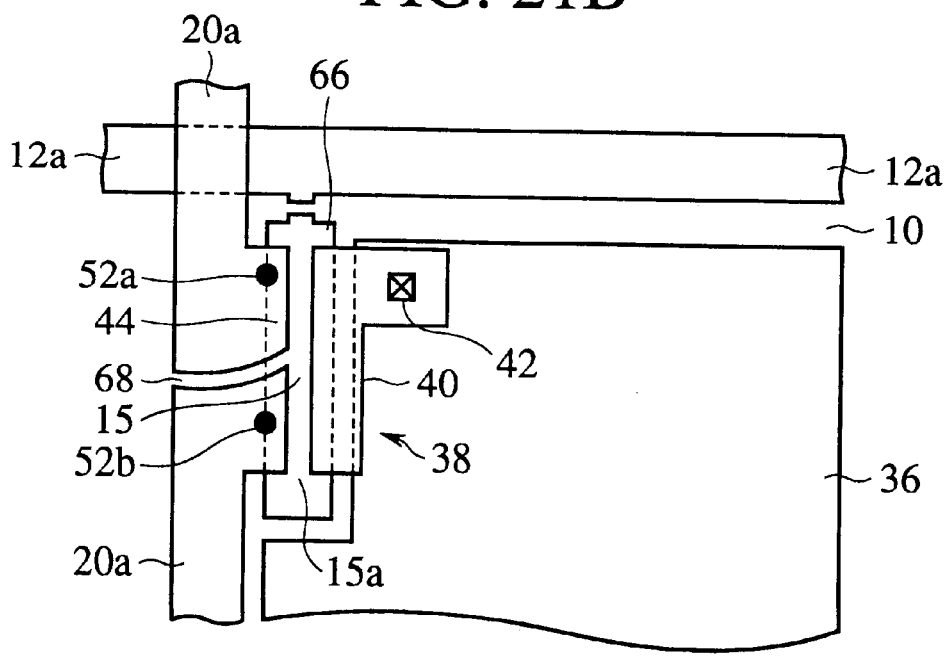
Figure 22:
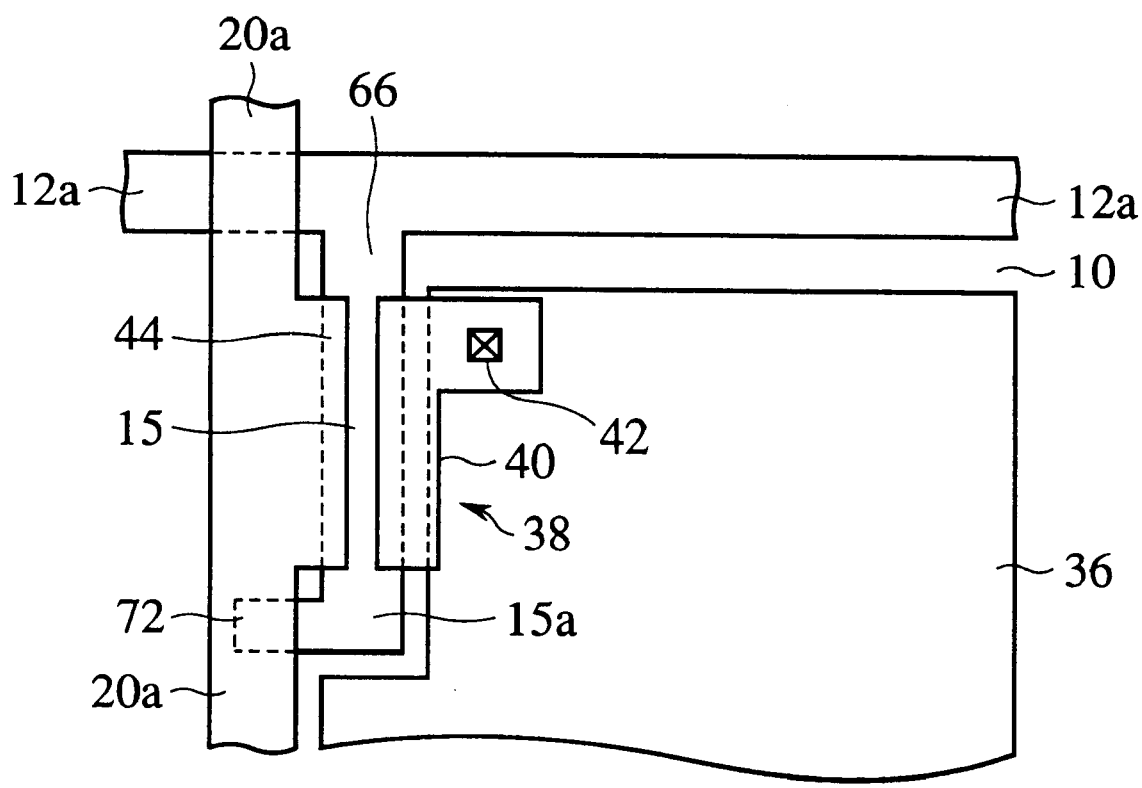
FIG. 22 is a plan view of a second additional example of the liquid crystal display device according to the third embodiment of the present invention.
Figure 23A:
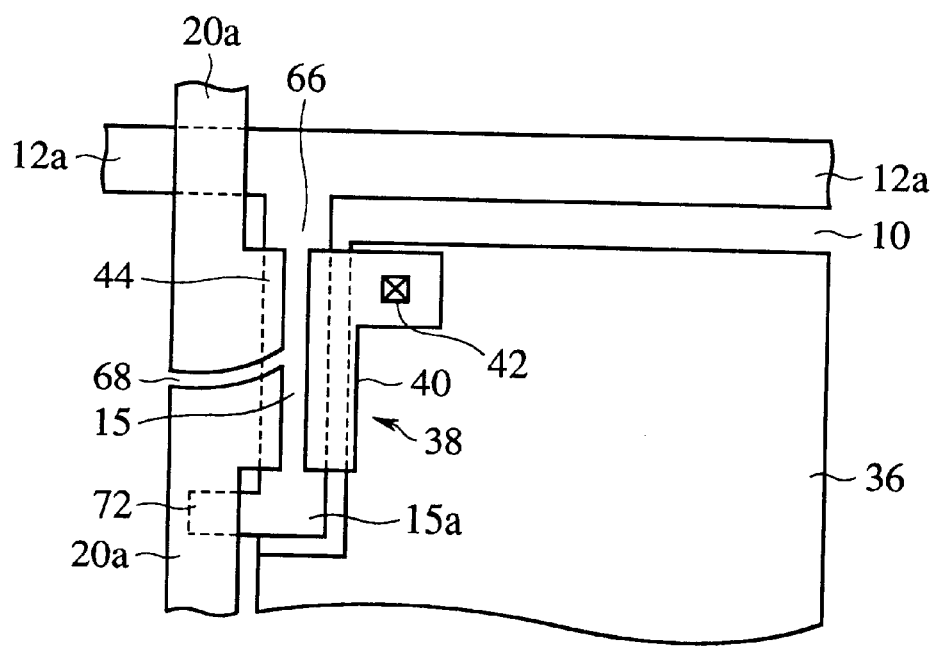
FIGS. 23A and 23B are plan views of the second additional example of the liquid crystal display device according to the third embodiment of the present invention, which show a repair process therefor.
Figure 23B:
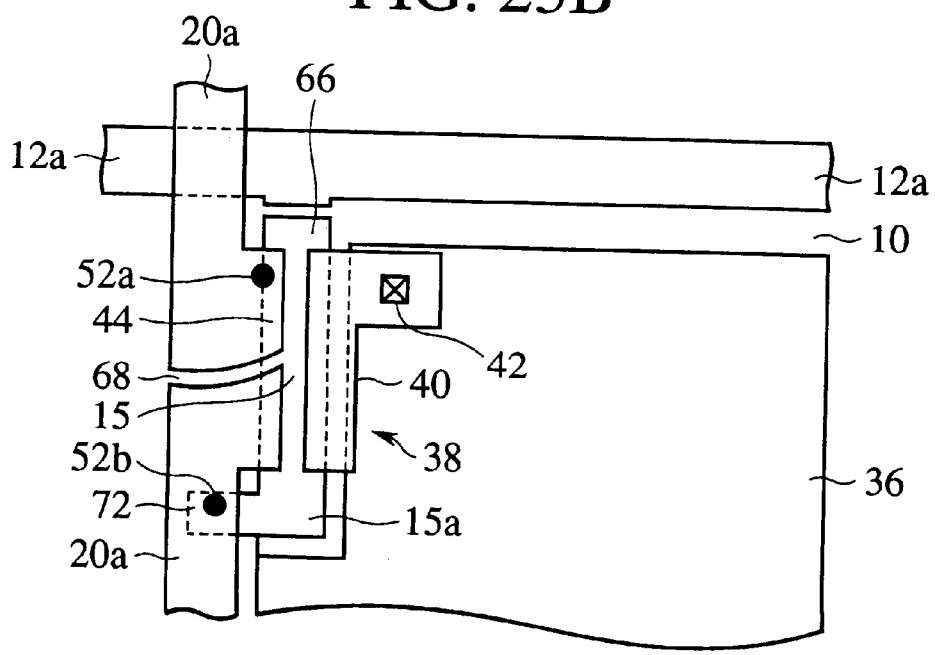
Figure 24:
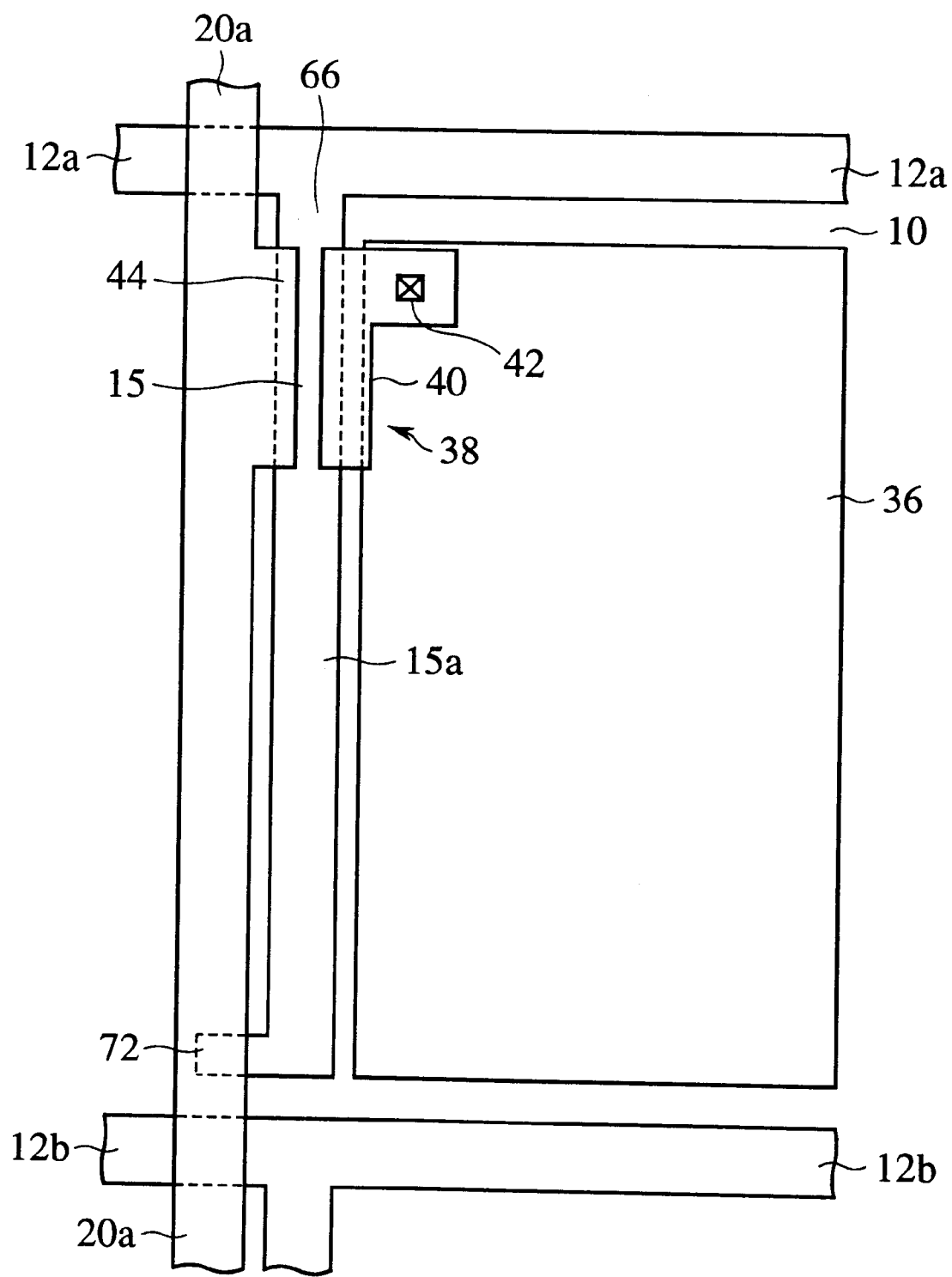
FIG. 24 is a plan view of a third additional example of the liquid crystal display device according to the third embodiment of the present invention.
Figure 25:
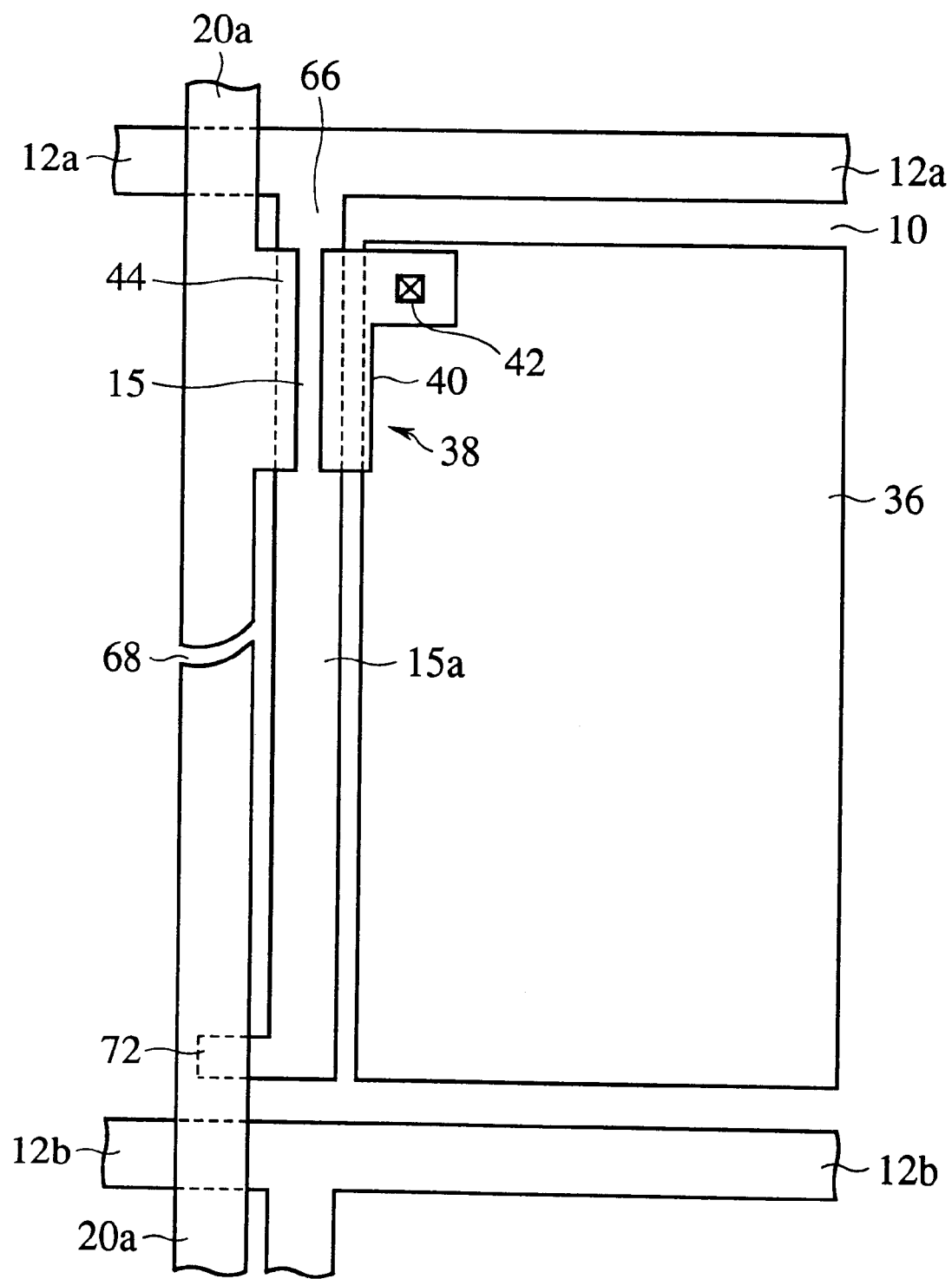
FIG. 25 is a plan view (Part 1) of the third example of the liquid crystal display device according to the third embodiment of the present invention, which shows a repair process therefor.
Figure 26:
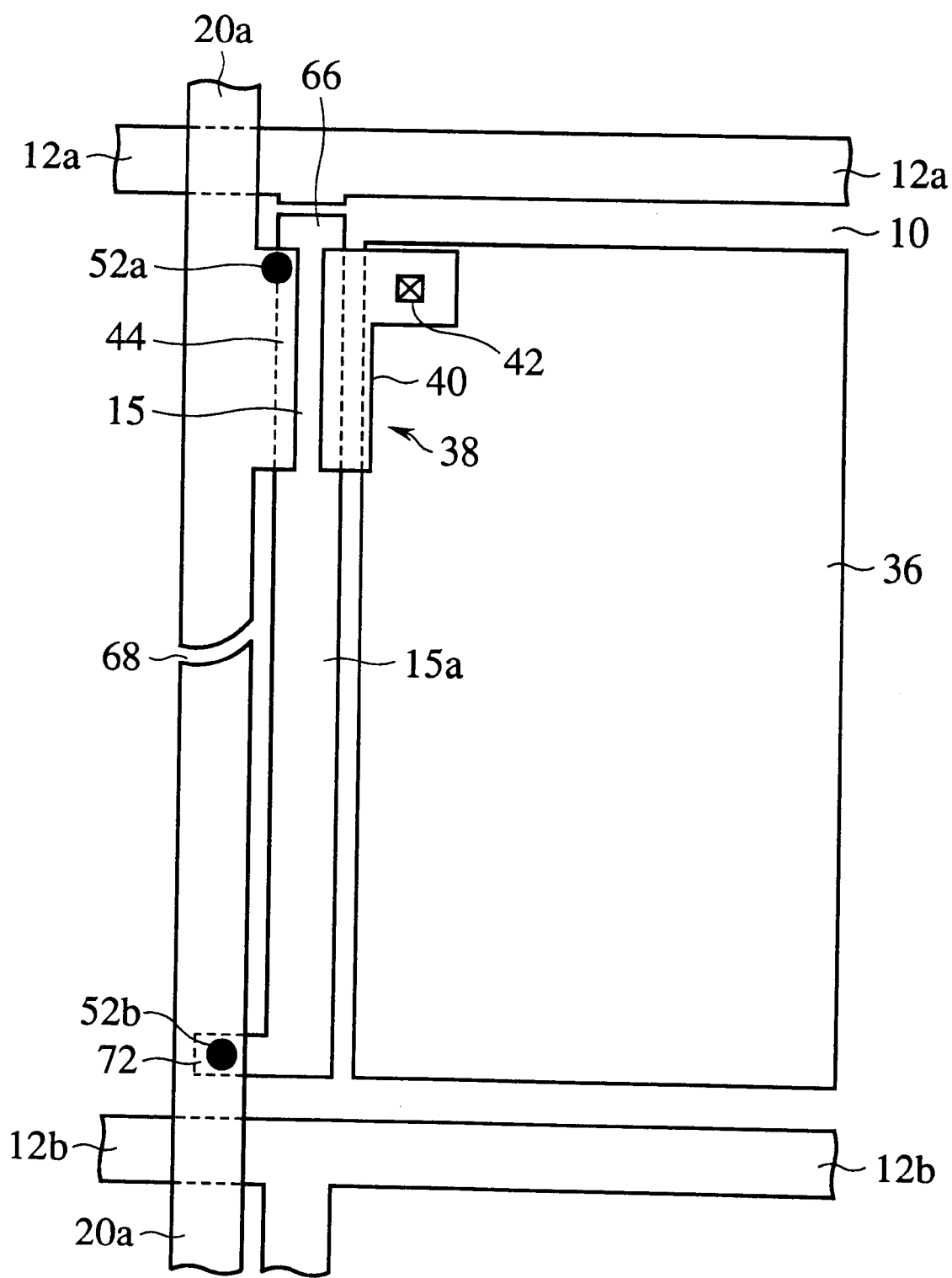
FIG. 26 is a plan view (Part 2) of the third example of the liquid crystal display device according to the third embodiment of the present invention, which shows a repair process therefor.
Figure 27:
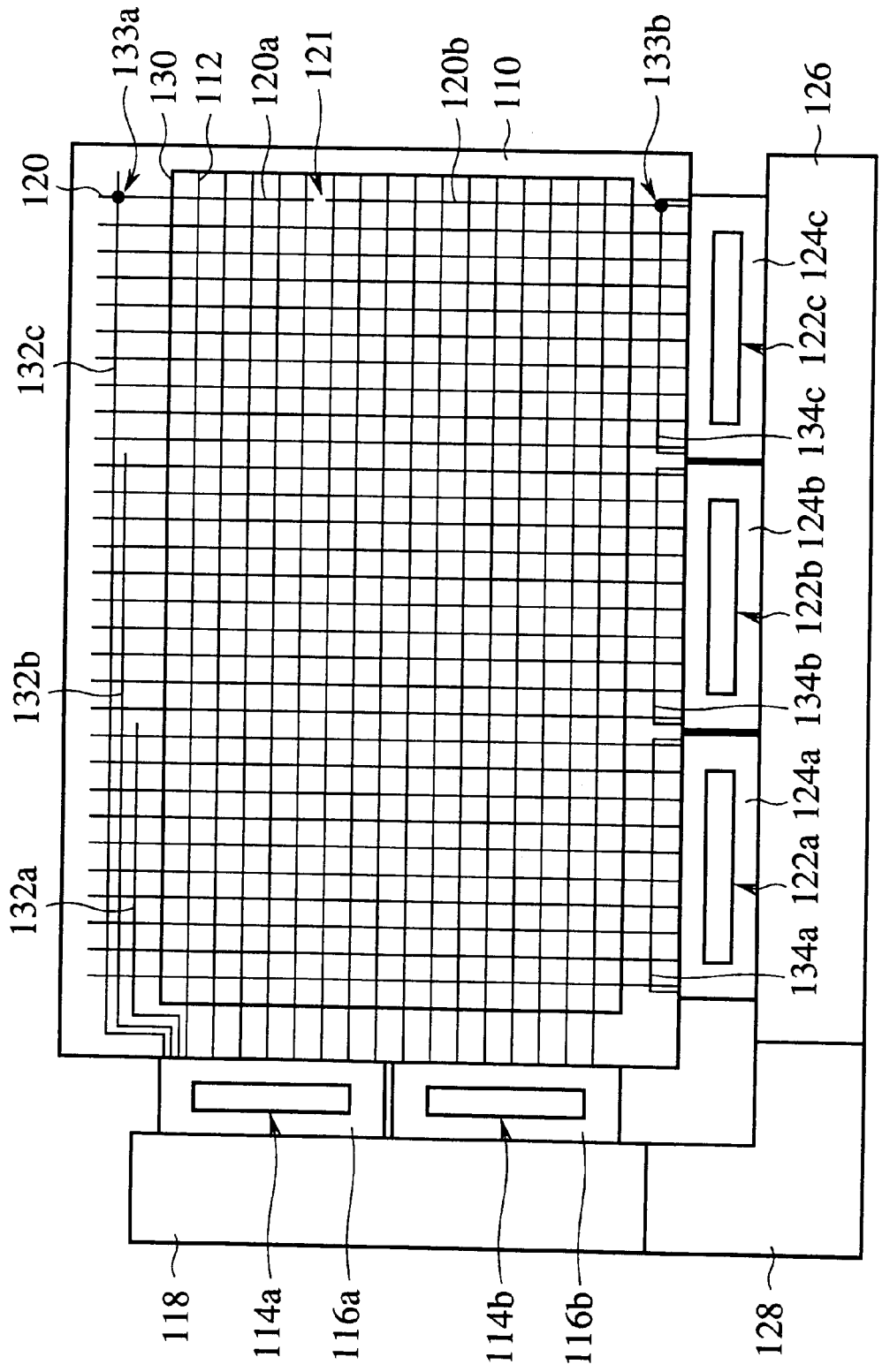
FIG. 27 is a plan view of the conventional liquid crystal display device.
Figure 28A:
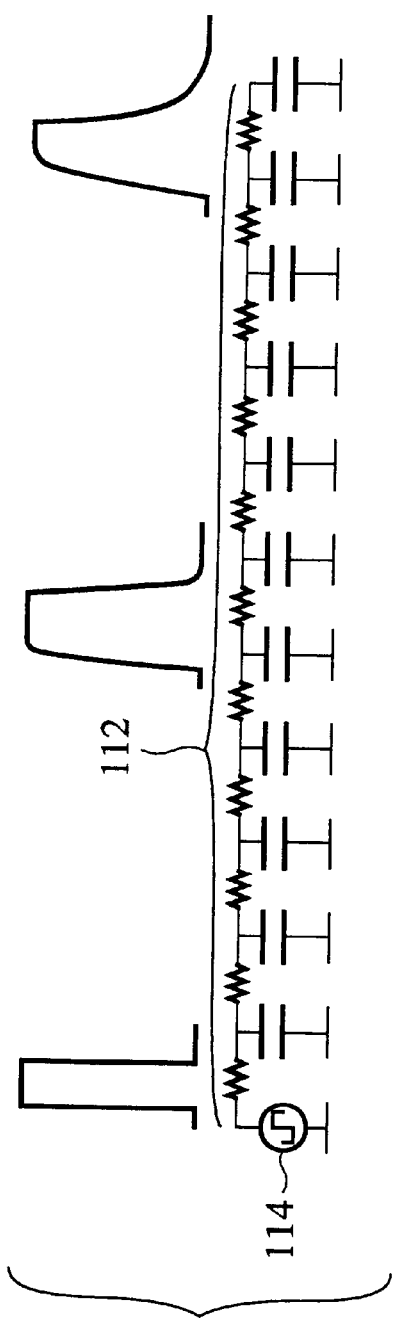
FIGS. 28A and 28B are conceptual views of a gate signal waveform for the gate bus line repaired by a repair line.
Figure 28B:
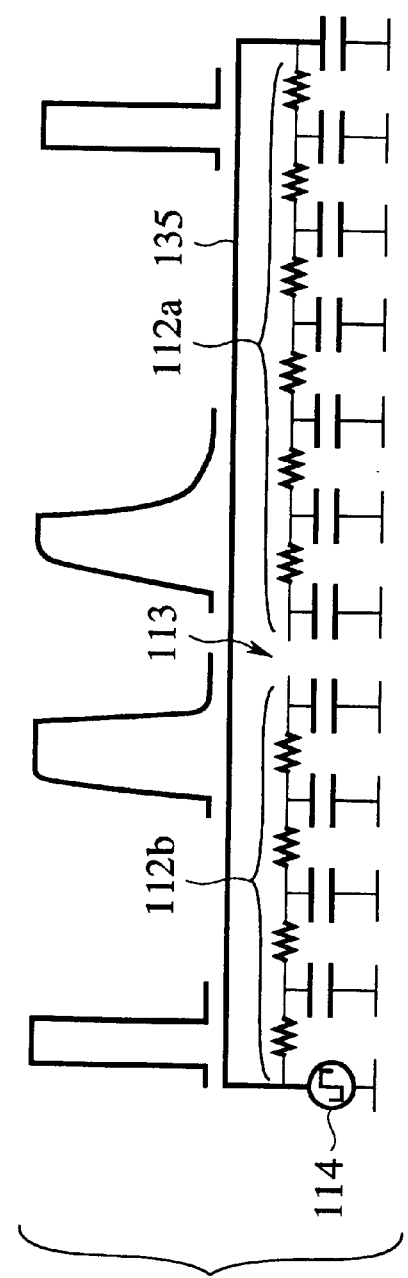
Figure 29A:
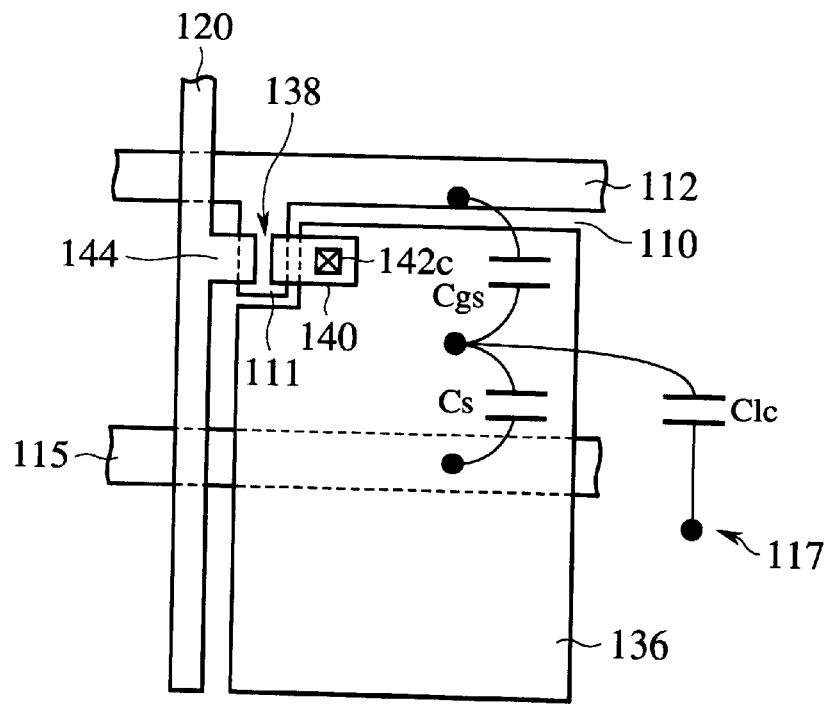
Figure 29B:
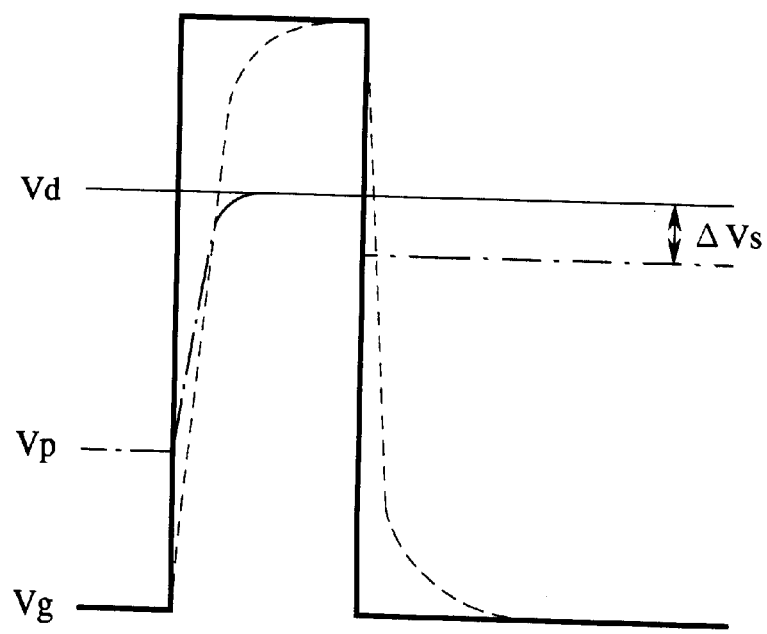

The liquid crystal display device according to a third embodiment of the present invention and the repair process for the liquid crystal display device will be explained with reference to FIGS. 17 to 26. FIG. 17 is a plan view of the liquid crystal display device, which shows a general structure thereof. FIG. 18 is a plan view of the liquid crystal display device according to the present embodiment. FIGS. 19A and 19B are plan views of the liquid crystal display device according to the present embodiment, which show the repair process therefor. FIG. 20 is a plan view of a first additional example of the liquid crystal display device according to the present embodiment. FIGS. 21A and 21B are plan views of the liquid crystal display device of the first additional example, which show the repair process therefor. FIG. 22 is a plan view of a second additional example of the liquid crystal display device according to the present embodiment. FIGS. 23A and 23B are plan views of the liquid crystal display device of the second additional example of the present embodiment, which show the repair process for the second additional example. FIG. 24 is a plan view of a third additional example of the liquid crystal display device according to the present embodiment. FIG. 25 is a plan view (Part 1) of the liquid crystal display device of the third additional example of the liquid crystal display device according to the present embodiment. FIG. 26 is a plan view (Part 2) of the liquid crystal display device of the third additional example of the liquid crystal display device according to the present embodiment. The same members of the liquid crystal display device according to the present embodiment as those of the liquid crystal display device according to the first and the second embodiments shown in FIGS. 1 to 16B are represented by the same reference numbers not to repeat or to simplify their explanation.

The liquid crystal display device according to the present embodiment and the repair process therefor are characterized in that a line disconnection of a data bus line is repaired without utilizing a repair line.

First, the general structure of the liquid crystal display device according to the present embodiment will be explained with reference to FIG. 17.

For the repair process for the liquid crystal display device according to the present embodiment, no repair line is formed outside a display region 30 as shown in FIG. 17. Accordingly it is not necessary to spare outside the display region 30 a region for repair lines to be formed in, which allows the liquid crystal display device to be smaller-sized.

Because of no repair line it is not necessary to form lines interconnecting the repair lines on print substrates 18, 26, etc., which can prevent complicated design and lead to lower costs of the liquid crystal display device.

Then, the liquid crystal display device according to the present embodiment will be explained with reference to FIG. 18.

As shown in FIG. 18, in the liquid crystal display device according to the present embodiment a TFT 38 is formed on the left side of a picture element electrode 36 as viewed in the drawing.

A gate bus line 12a does not function as the gate electrode of the TFT 38, and the gate electrode 15 is connected to the gate bus line 12a through a connection 66. On the other hand, a drain electrode 44 is formed integral with a data bus line 20a. The drain electrode 44 is formed elongated up-to-down as viewed in the drawing.

In the liquid crystal display device including the TFT formed on the left side of a picture element electrode as viewed in the drawing it is general that an up-to-down length of an amorphous silicon film (not shown) as viewed in the drawing, which functions as a channel of the TFT 38 is suitably set in consideration of a number of the gate bus lines 12, a load capacitance of the TFT, etc. Lengths of the gate electrode 15 and the drain electrode 44 are also set to be substantially the same as the up-to-down length of the amorphous silicon film as viewed in the drawing.

In the present embodiment, however, it is not essential to set up-to-down lengths of the gate electrode 15 and the drain electrode 44 as viewed in the drawing to be substantially the same as an up-to-down length of the amorphous silicon film as viewed in the drawing, but the former is set to be longer as required than the latter. That is, the present embodiment is characterized in that the gate electrode 15 has an extension 15a in addition to a region which intrinsically functions as a gate.

In repairing a line disconnection of a data bus line 20a this allows for a wider region where the line disconnection can be repaired by the repair process which will be described below.

Preferably, the gate electrode 15 including the extension 15a is formed at least in a region which functions as the channel, and furthermore occupies above 50%, more preferably above 90% of that of a region between the gate bus line 12a and its adjacent gate bus line (not shown), which does not function as the channel.

Then the repair process for the liquid crystal display device according to the present embodiment will be explained with reference to FIG. 19.

It is assumed that, as shown in FIG. 19A, a line disconnection of the data bus line 20a is present in, e.g., a region where the drain electrode 44 is formed integral with the data bus line 20a.

When such line disconnection of the data bus line 20a is present, that of the drain electrode 44 on the upper side of the line disconnected part 68 as viewed in the drawing, and the gate electrode 15 are connected to each other by laser beam application, and that of the drain electrode 44 on the lower side of the line disconnected part 68 as viewed in the drawing by laser beam application. Connected regions 52a, 52b where the gate electrode 15 and the drain electrode 44 are connected to each other are blacked out in FIG. 19B.

Then, as shown in FIG. 19B, laser beams are applied to the connection 66 to disconnect the gate electrode 15 from the gate bus line 12a.

Thus, the disconnected data bus line 20a is repaired.

As described above, in the present embodiment the data bus line with the drain electrode formed integral therewith is repaired by utilizing the gate electrode, which permits the line disconnection of the data bus line to be repaired without using a repair line.

In addition, it is not necessary to form repair lines outside the display region, and the liquid crystal display can be accordingly small-sized.

Because no repair line crossing the data bus line is formed, no insulation breakage takes place due to static electricity in the insulation film between the repair line and the data bus line, and the fabrication of the liquid crystal display device can have improved yields.

Because a line breakage of the data bus line can be repaired without using a repair line, and it is not necessary to form lines for connecting repair lines on the print substrate, etc. nor it is necessary to form an operational amplifier, etc. which are required when a length of the connection by a repair line is large, whereby cost reduction of the liquid crystal display device can be realized.

Then, additional examples of the liquid crystal display device according to the present embodiment and the repair process for the same will be explained with reference to FIGS. 20 to 26.

A First Additional Example

A first additional example of the liquid crystal display device according to the present embodiment and the repair process for the same will be explained with reference to FIGS. 20 to 21A. FIG. 20 is a plan view of the first additional example of the liquid crystal display device according to the present embodiment. FIGS. 21A and 21B are plan views of the first additional example of the liquid crystal display device according to the present embodiment, which show the repair process for the same.

As shown in FIG. 20, a notch 70 is formed in the connection 66 at a part to be cut off so that the connection 66 between the gate electrode 15 and the gate bus line 12a can be disconnected for a short period of time. The notch 70 partially thins the connection 66. The connection 66 is thinned by the notch 70, which enables the connection 66 to be cut off for a short period of time.

The notch 70 is indicative of a part where the connection 66 is to be cut off, which can improve processing efficiency.

Then, the repair process according to the present example will be explained with reference to FIGS. 21A and 21B.

It is assumed that, as shown in FIG. 21A, a line breakage of the data bus line 20a is present in the region where the drain electrode 44 is formed integral therewith. In this case, the process for connecting the disconnected data bus line 20a by the gate electrode 15 is the same as the process shown in FIG. 19B.

Then, to disconnect the gate electrode 15 and the gate bus line 12a from each other the connection 66, which is thinned by the notch 70, is disconnected by laser beam application (see FIG. 21B)).

As described above, according to the present example, because of the notch 70 formed in the connection 66 between the gate electrode 15 and the gate bus line 12a the connection 66 can be disconnected for a short period of time.

The notch 70 is clearly indicative of a region to be cut off, which can improve processing efficiency.

A Second Additional Example

Then, a second additional example of the liquid crystal display device according to the present embodiment and the repair process for the same will be explained with reference to FIGS. 22 to 23B. FIG. 22 is a plan view of a second additional example of the liquid crystal display device according to the present embodiment. FIG. 23 is plan views of the second additional example of the liquid crystal display device according to the present embodiment, which show the repair process therefor.

As shown in FIG. 22, a pad 72 is formed on the lower end of the gate electrode 15 as viewed in the drawing, extended to the left as viewed in the drawing and opposed to the data bus line 20a.

In the present example, because of the pad 72 formed on the lower end for the gate electrode 15 as viewed in the drawing, the connection by laser beam application can be ensured. In addition, alignment for applying laser beams is facilitated, with a result of higher processing efficiency.

Next, the repair process for the liquid crystal display device of the present example will be explained with reference to FIGS. 23A and 23B.

It is assumed that, as shown in FIG. 23A, a line disconnection of the data bus line 20a is present in a region below the region where the drain electrode 44 is formed.

In the case of such line disconnection of the data bus line 20a, that of the drain electrode 44 upper of the line disconnected part 68 as viewed in the drawing, and the gate electrode 15 are connected to each other by laser beam application, and that of the data bus line 20a lower of the line disconnected part 68 as viewed in the drawing, and the pad 72 are connected to each other by laser beam application.

The connection 66 is disconnected by laser beam application (FIG. 23B).

Thus the disconnected data bus line 20a can be repaired.

As described above, according to the present embodiment, the pad is formed on the end of the gate electrode, which ensures the connection by laser beam application. Furthermore, alignment for the laser beam application is facilitated, with a result of higher processing efficiency.

A Third Additional Example

Then, a third additional example of the liquid crystal display device according to the present embodiment and the repair process for the same will be explained with reference to FIGS. 24 to 26. FIG. 24 is a plan view of the third additional example of the liquid crystal display device according to the present embodiment. FIGS. 25 and 26 are plan views of the third additional example of the liquid crystal display device according to the present embodiment, which show the repair process therefor.

As shown in FIG. 24, in the present example, the gate electrode 15 connected to the gate bus line 12a which is upper in the drawing is extended to the vicinity of the gate bus line 12b which is lower in the drawing. That is, an extension 15a of the gate electrode 15 is extended to the vicinity of the gate bus line 12b, which is lower in the drawing.

The pad 72 is formed on the lower end of the extension 15a of the gate electrode 15 as viewed in the drawing, extended to the left as viewed in the drawing and opposed the data bus line 20a. The extension 15a of the gate electrode 15 is extended to the vicinity of the gate bus line 12b, which is lower in the drawing, which can provide a wide range where a line disconnection of the data bus line 68 can be repaired.

Then, the repair process for the liquid crystal display device of the present example will be explained with reference to FIGS. 25 and 26.

It is assumed that, as shown in FIG. 25, a line disconnection of the data bus line 68 is present in a region where the drain electrode 44 is not formed.

In the case of such line disconnection of the data bus line 68, as shown in FIG. 26 the drain electrode 44 and the gate electrode 15 are connected to each other by laser beam application, and the pad 72 and the data bus line 20a are connected to each other by laser beam application.

The connection 66 is disconnected by laser beam application.

Thus the disconnected data bus line 20a is repaired.

As described above, in the present example, the gate electrode is extended from the gate bus line which is upper in the drawing to the vicinity of the gate bus line which is lower in the drawing, and the pad is opposed to the data bus line, whereby a wide range where a line disconnection of the data bus line can be repaired.

Modifications

The present invention is not limited to the above-described embodiments and cover various modifications.

For example, in the first or the second embodiment, the repair lines are formed in the liquid crystal display device, but the repair lines are not necessary unless the data bus line has a line disconnection repaired. In this case, it is unnecessary to form the repair lines outside the display region, whereby the liquid crystal display device can have a narrow margin. Furthermore, decrease of fabrication yields of the liquid crystal display device due to electrostatic, etc. accumulated in the repair lines can be precluded. In addition, it is not necessary to form operational amplifiers, etc. which are required when a connection by the repair line is longer, which can make the liquid crystal display device inexpensive.

In the above-described embodiments, one pad is formed. A plurality of pads may be formed, whereby the connection by laser beam application can be more ensured, and higher processing efficiency can be obtained.

What is claimed is:

1. A liquid crystal display device comprising:
   a gate bus line;
   a data bus line crossing the gate bus line;
   a picture element electrode; and
   a transistor including a gate electrode, a first electrode connected to the data bus line and a second electrode connected to the picture element electrode,
   the first electrode and/or the second electrode being extended along the gate bus line, wherein the first electrode and/or the second electrode is formed at least in a region that functions as a channel and also occupies more than 50% of another region that does not function as a channel, where both said region that functions as the channel and said another region are located between the data bus line and another data bus line adjacent to the data bus line.

2. A liquid crystal display device comprising:

a gate bus line;

a data bus line crossing the gate bus line;

a picture element electrode; and a transistor including a gate electrode, a first electrode connected to the data bus line and a second electrode connected to the picture element electrode, the first electrode and/or the second electrode being extended along the gate bus line, further comprising a connection connecting the first electrode and the data bus line to each other, a notch being formed in a part of the connection, the notch partially thinning the connection.

3. A liquid crystal display device comprising:

a gate bus line, having both a length and a width;

a data bus line crossing the gate bus line;

a picture element electrode; and a transistor including a gate electrode, a first electrode connected to the data bus line and a second electrode connected to the picture element electrode, the first electrode and/or the second electrode being extended along the gate bus line, wherein the first electrode and/or the second electrode further includes a pad opposed to the gate bus line, the pad being projected from the first electrode and/or the second electrode, the pad being opposed to the center, relative to the width, of the gate bus line.

4. A liquid crystal display device comprising:

a gate bus line;

a data bus line crossing the gate bus line;

a picture element electrode; and a transistor including a gate electrode connected to the gate bus line, a first electrode formed integral with the data bus line, and a second electrode connected to the picture element electrode, the gate electrode including an extension formed along the data bus line, wherein the gate electrode including the extension is formed at least in a region which functions as a channel and also occupies more than 50% of another region that does not function as a channel, where both said region that functions as the channel and said another region are located between the gate bus line and another gate bus line adjacent to the gate bus line.

5. A liquid crystal display device comprising:

a gate bus line;

a data bus line crossing the gate bus line, said data bus line having a length and a width;

a picture element electrode; and a transistor including a gate electrode connected to the gate bus line, a first electrode formed integral with the data bus line, and a second electrode connected to the picture element electrode, the gate electrode including an extension formed along the data bus line, wherein the gate electrode further includes a pad opposed to the data bus line, the pad being projected from the extension, the pad being opposed to the center, relative to the width, of the data bus line.

6. A liquid crystal display device comprising:

a gate bus line;

a data bus line crossing the gate bus line;

a picture element electrode; and a transistor including a gate electrode, a first electrode connected to the data bus line and a second electrode connected to the picture element electrode, the first electrode and/or the second electrode being extended along the gate bus line, wherein the first electrode and/or the second electrode is extended from a vicinity of the data bus line to a vicinity of another data bus line adjacent to the data bus line, and a length of the first electrode along the gate bus line differs from that of the second electrode.

7. A liquid crystal display device comprising a gate bus line, a data bus line crossing the gate bus line, a picture element electrode, and a transistor including a first electrode connected to the data bus line and a second electrode connected to the picture element electrode, the first electrode being extended along the gate bus line, in a case that the gate bus line has a line disconnection, that of the gate bus line on one side of the line disconnected part being connected to the first electrode, and that of the gate bus line on the other side of the line disconnected part being connected to the first electrode, and the first electrode being disconnected from the data bus line.

8. A repair process for a liquid crystal display device comprising a gate bus line, a data bus line crossing the gate bus line, a picture element electrode, and a transistor including a first electrode connected to the data bus line and a second electrode connected to the picture element electrode, the first electrode being extended along the gate bus line, in a case that the gate bus line has a line disconnection, that of the gate bus line on one side of the line disconnected part and the first electrode being connected, and that of the gate bus line on the other side of the line disconnected part being connected to the first electrode, whereby the line disconnected part of the gate bus line is repaired by the first electrode, and the first electrode being disconnected from the data bus line.

9. A repair process for a liquid crystal display device according to claim 8, wherein the first electrode is connected to the data bus line through a connection with a notch formed in, and the connection is disconnected at a region where the data bus line is thinned by the notch when the first electrode is disconnected from the data bus line.

10. A repair process for a liquid crystal display device according to claim 9, wherein the first electrode or the second electrode further includes a pad opposed to the gate bus line, and in a case that a line disconnection between the gate bus line on said one side of the line disconnected part and the gate bus line on said other side of the line disconnected part is repaired, the pad is connected to the gate bus line on said one side of the line disconnected part and/or the gate bus line on said other side of the line disconnected part.

11. A repair process for a liquid crystal display device according to claim 9, wherein
the first electrode or the second electrode further is connected to the gate bus line by laser beam application.

12. A repair process for a liquid crystal display device according to claim 8, wherein
the first electrode or the second electrode further includes a pad opposed to the gate bus line, and
in a case that a line disconnection between the gate bus line on said one side of the line disconnected part and the gate bus line on said other side of the line disconnected part is repaired, the pad is connected to the gate bus line on said one side of the line disconnected part and/or the gate bus line on said other side of the line disconnected part.

13. A repair process for a liquid crystal display device according to claim 8, wherein
the first electrode or the second electrode is connected to the gate bus line by laser beam application.

14. A liquid crystal display device comprising a gate bus line, a data bus line crossing the gate bus line, a picture element electrode, and a transistor including a first electrode connected to the data bus line and a second electrode connected to the picture element electrode, the first electrode being extending along the gate bus line,
in a case that the gate bus line has a line disconnection, that of the gate bus line on one side of the line disconnected part being connected to a prescribed region of the data bus line, and that of the gate bus line on the other side of the line disconnected pat being connected to the first electrode connected to the prescribed region of the data bus line, and
the prescribed region being disconnected from the data bus line.

15. A liquid crystal display device comprising a gate bus line, a data bus line crossing the gate bus line, a picture element electrode, and a transistor including a first electrode connected to the data bus line and a second electrode connected to the picture element electrode, the second electrode being extended along the gate bus line,
in a case that the gate bus line has a line disconnection, that of the gate bus line on one side of the line disconnected part being connected to the second electrode, and that of the gate bus line on the other side of the line disconnected part being connected to the second electrode.

16. A liquid crystal display device comprising a gate bus line; a data bus line crossing the gate bus line; a picture element electrode; and a transistor including a gate electrode connected to the gate bus line and a first electrode formed integral with the data bus line, and a second electrode connected to the picture element electrode, the gate electrode being extended along the data bus line,
in a case that the data bus line has a line disconnection, that of the data bus line on one side of the line disconnected part being connected to the gate electrode, and that of the data bus line on the other side of the line disconnected part being connected to the gate electrode, and
the gate electrode being disconnected from the gate bus line.

17. A repair process for a liquid crystal display device comprising a gate bus line, a data bus line crossing the gate bus line, a picture element electrode, and a transistor including a first electrode connected to the data bus line and a second electrode connected to the picture element electrode, the first electrode being extended along the gate bus line,
in a case that the gate bus line has a line disconnection, that of the gate bus line on one side of the line disconnected part being connected to a prescribed region of the data bus line, and that of the gate bus line on the other side of the line disconnected part being connected to the first electrode connected to the prescribed region of the data bus line, whereby the line disconnected part of the gate bus line is repaired by the prescribed region of the data bus line and the first electrode, and
the prescribed region is disconnected from the data bus line.

18. A repair process for a liquid crystal display device according claim 17, wherein
the first electrode or the second electrode further includes a pad opposed to the gate bus line, and
in a case that a line disconnection between the gate bus line on said one side of the line disconnected part and the gate bus line on said other side of the line disconnected part is repaired, the pad is connected to the gate bus line on said one side of the line disconnected part and/or the gate bus line on said other side of the line disconnected part.

19. A repair process for a liquid crystal display device according to clam 17, wherein
the first electrode or the second electrode is connected to the gate bus line by laser beam application.

20. A repair process for a liquid crystal display comprising a gate bus line, a data bus line crossing the gate bus line, a picture element electrode, and a transistor including a first electrode connected to the data bus line and a second electrode connected to the picture element electrode, the second electrode being extended along the gate bus line,
in a case that the gate bus line has a line disconnection, that of the gate bus line on one side of the line disconnected part being connected to the second electrode, and that of the gate bus line on the other side of the line disconnected part being connected to the second electrode, whereby the line disconnected part of the gate bus line is repaired by the second electrode.

21. A repair process for a liquid crystal display device according to claim 20, wherein
the first electrode or the second electrode further includes a pad opposed to the gate bus line, and
in a case that a line disconnection between the gate bus line one line on said one side of the line disconnected part and the gate bus line on said other side of the line disconnected part is repaired, the pad is connected to the gate bus line on said one side of the line disconnected part and/or the gate bus line on said other side of the line disconnected part.

22. A repair process for a liquid crystal display device according to claim 20, wherein
the first electrode or the second electrode is connected to the gate bus line by laser beam application.

23. A repair process for a liquid crystal display device comprising a gate bus line; a data bus line crossing the gate bus line; a picture element electrode; and a transistor including a gate electrode connected to the gate bus line and a first electrode formed integral with the data bus line, and a second electrode connected to the picture element electrode, the gate electrode being extended along the data bus line,
in a case that the data bus line has a line disconnection, that of the data bus line on one side of the line disconnected part and the gate electrode being connected to each other, and that of the data bus line on the other side of the line disconnected part being connected to the gate electrode, the line disconnected part of the data bus line being repaired by the gate electrode; and the gate electrode being disconnected from the gate bus line.

24. A repair process for a liquid crystal display device according to claim 23, wherein the gate electrode further includes a pad opposed to the data bus line, in a case that a line disconnection between the gate bus line one said one side of the line disconnected part and the data bus line on said other side of the line disconnected part is repaired, the first electrode formed integral with the data bus line on said one side of the line disconnected part and the gate electrode are connected to each other, and the gate bus line on said other side of the line disconnected part and the pad are connected to each other.

25. A repair process for a liquid crystal display device according to claim 23, wherein the first electrode or the data bus line is connected to the gate electrode by laser beam application.

* * * * *

UNITED STATES PATENT AND TRADEMARK OFFICE
CERTIFICATE OF CORRECTION

PATENT NO. : 6,680,770 B1
DATED : January 20, 2004
INVENTOR(S) : Yoji Nagase

It is certified that error appears in the above-identified patent and that said Letters Patent is hereby corrected as shown below:

Title page,
Item [56], References Cited, FOREIGN PATENT DOCUMENTS, insert the following:
-- JP 61-105528    5/1986
   JP 62-91993     4/1987
   JP 2-254419    10/1990
   JP 4-265946     9/1992
   JP 5-11261      1/1993
   JP 5-19294      1/1993
   JP 5-333373    12/1993
   JP 9-325363    12/1997
   JP 10-26771     1/1998
   JP 10-232408    9/1998 --

Column 21,
Line 31, delete "pat" and insert -- part -- therefor.

Column 22,
Line 49, delete "one line".

Signed and Sealed this

Seventh Day of September, 2004

JON W. DUDAS
*Director of the United States Patent and Trademark Office*